United States Patent
Kahan et al.

(10) Patent No.: US 11,380,330 B2
(45) Date of Patent: Jul. 5, 2022

(54) CONVERSATIONAL RECOVERY FOR VOICE USER INTERFACE

(71) Applicant: Amazon Technologies, Inc., Seattle, WA (US)

(72) Inventors: Eliav Samuel Zimmern Kahan, Jamaica Plain, MA (US); Gregory Newell, Somerville, MA (US); Mahesh Guruswamy, Brookline, MA (US); Daren Gill, Concord, MA (US); Prashant Rao, Woburn, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/997,024

(22) Filed: Aug. 19, 2020

(65) Prior Publication Data

US 2021/0027785 A1    Jan. 28, 2021

Related U.S. Application Data

(63) Continuation of application No. 15/842,456, filed on Dec. 14, 2017, now Pat. No. 10,762,903.

(60) Provisional application No. 62/582,784, filed on Nov. 7, 2017.

(51) Int. Cl.
| | |
|---|---|
| *G10L 15/32* | (2013.01) |
| *G10L 15/26* | (2006.01) |
| *G10L 15/18* | (2013.01) |
| *G06F 16/438* | (2019.01) |

(52) U.S. Cl.
CPC .......... *G10L 15/26* (2013.01); *G10L 15/1815* (2013.01); *G06F 16/4387* (2019.01); *G10L 15/1822* (2013.01); *G10L 15/32* (2013.01)

(58) Field of Classification Search
CPC ....................................................... G10L 15/32
See application file for complete search history.

(56) References Cited

U.S. PATENT DOCUMENTS

| | | | | |
|---|---|---|---|---|
| 8,204,890 B1* | 6/2012 | Gogan | ................ | G06F 16/4387 709/201 |
| 8,606,581 B1* | 12/2013 | Quast | ...................... | G10L 15/32 704/254 |
| 2012/0203552 A1* | 8/2012 | Sureka | .................... | G10L 21/16 704/235 |

* cited by examiner

*Primary Examiner* — Feng-Tzer Tzeng
(74) *Attorney, Agent, or Firm* — Pierce Atwood LLP

(57) ABSTRACT

A processing device executing a component of a conversational recovery system receives an intent data and a first entity data identified from user input data. The processing device determines that the first entity data is associated with first content associated with a first component. The processing device additionally receives a text data of the user input data. The processing device determines a word in the text data that matches a keyword associated with second content associated with a second component. The processing device ranks the first component and the second component. The processing device generates message data that comprises an inquiry with respect to choosing the first content or the second content.

19 Claims, 16 Drawing Sheets

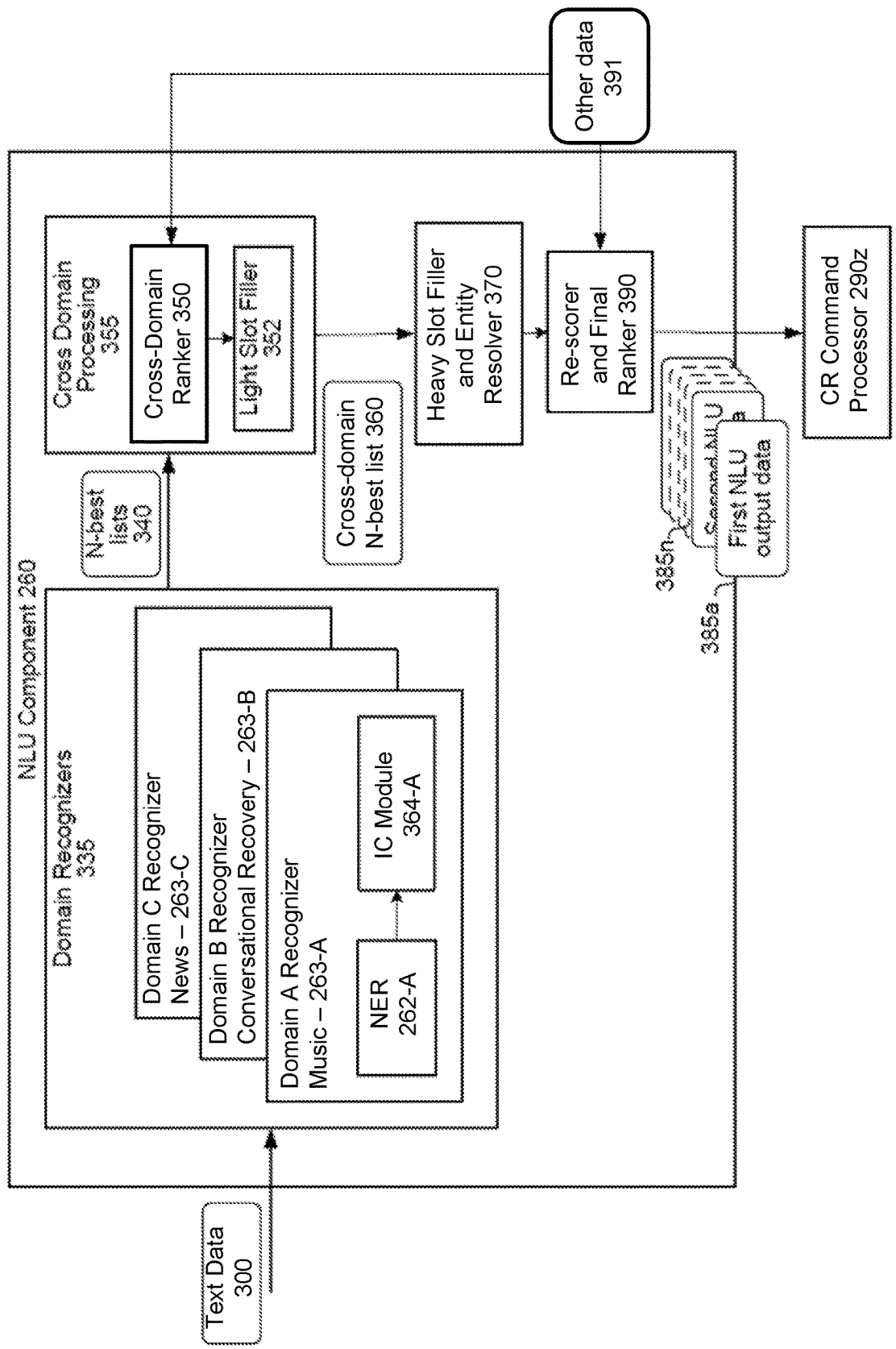

CONVERSATIONAL RECOVERY FOR VOICE USER INTERFACE

CROSS-REFERENCED TO RELATED APPLICATIONS

This patent application is a continuation of, and claims priority to, U.S. patent application Ser. No. 15/842,456, titled "CONVERSATIONAL RECOVERY FOR VOICE USER INTERFACE", filed on Dec. 14, 2017, which will issue as U.S. Pat. No. 10,762,903 on Sep. 1, 2020, which claims the benefit under 35 U.S.C. § 119(e) of U.S. Provisional Application No. 62/582,784, filed Nov. 7, 2017. The above applications are hereby incorporated by referenced in their entirety.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech. Some computing devices include a voice user interface (VUI) that enables a user to interact with the computing devices using speech.

BRIEF DESCRIPTION OF DRAWINGS

For a more complete understanding of the present disclosure, reference is now made to the following description taken in conjunction with the accompanying drawings.

FIG. 3 is a conceptual diagram of a system architecture for parsing incoming utterances using multiple domains according to embodiments of the present disclosure.

DETAILED DESCRIPTION

Figure 1A:
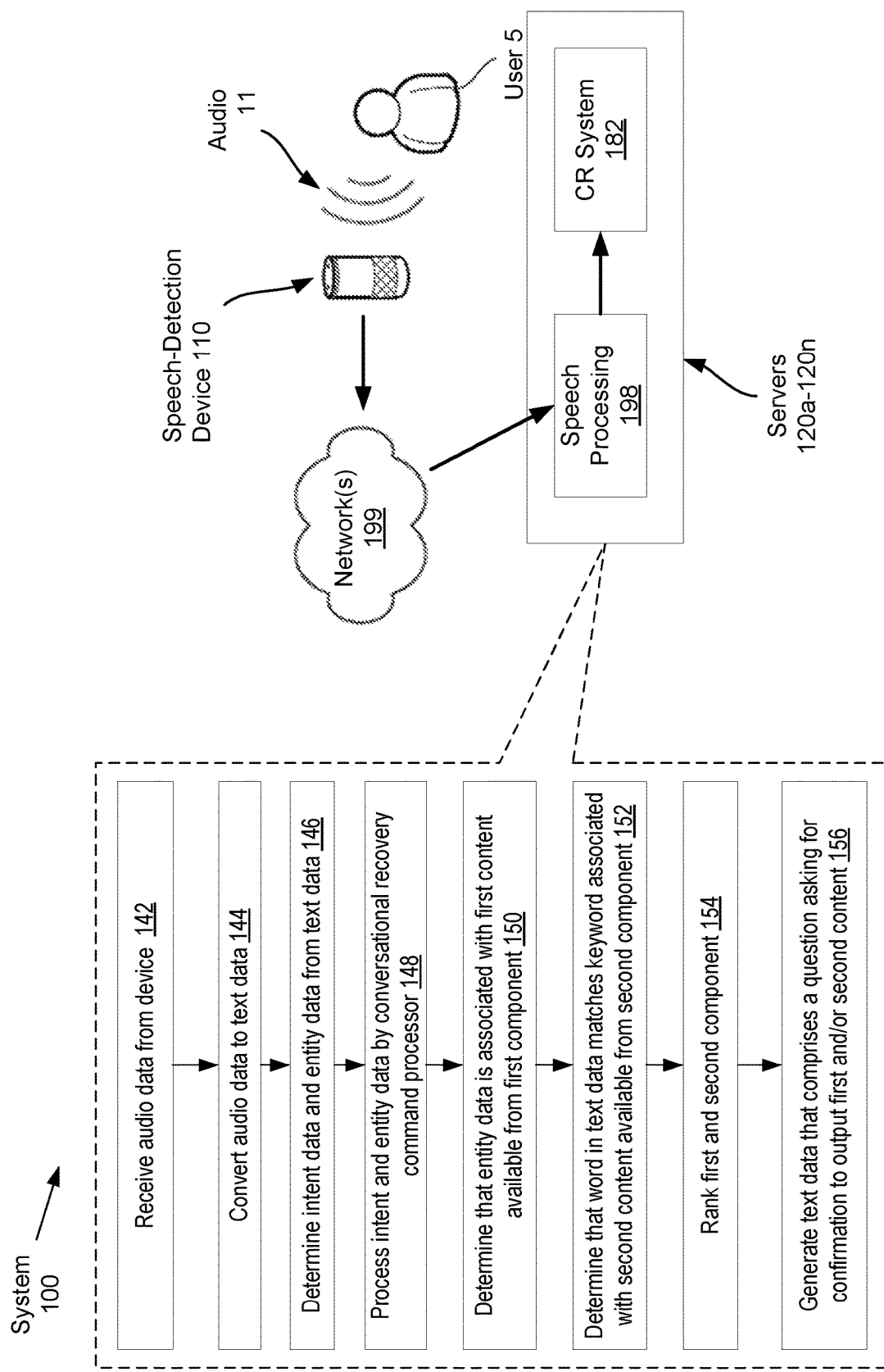
FIGS. 1A-1C illustrate a system configured to perform conversational recovery operations using audio data according to embodiments of the present disclosure.

Embodiments described herein are directed to a conversational recovery (CR) system for a natural language user interface (e.g., such as a voice user interface (VUI), a text user interface, a video user interface, and so on). Voice user interfaces receive voice inputs and perform operations based on those voice inputs. Text user interfaces receive text inputs and perform operations based on those text inputs. In some instances users provide user input data that a natural language user interface (NLUI) is unable to implement. The NLUI may respond in such instances with an audio message and/or text message expressing failure. The message may say, for example, "I'm sorry, but I don't understand," "I'm not sure," "I can't find that song," and so on. When the NLUI would otherwise fail to determine an operation to perform, the CR system determines one or more likely user intent data and then may generate message data (which may include audio data, text data and/or image data) asking whether a user intended a particular operation to be performed and/or suggesting a particular operation. The CR system may reduce the number of instances in which the NLUI fails to understand user voice commands. Accordingly, the CR system improves a user experience for the NLUI.

In some embodiments, a processing device executing a component of a CR system receives intent data associated with user input data (e.g., an utterance, motion data from a motion sensor, touch data from a touch interface, text data from a keyboard, click data from a mouse, location data from a location sensor, etc.) from a client device. The processing device further receives entity data associated with the intent data. The intent data and entity data may be received responsive to a speech processing unit or other unit failing to determine any other user intent data determined from the user input data (e.g., from audio data representing the utterance). The intent data and entity data may also be received from a command processor and/or component that initially received the intent data and entity data from the speech processing unit or other unit. The processing device determines that the entity data represents first content data of a first type of content available from (or otherwise associated with) a first component. The processing device additionally receives text data representing the user input data (e.g., representing words included in the audio data representing the utterance). The processing device determines a word represented by the text data that matches a keyword associated with second entity data associated with a second component, wherein the second entity data represents second content data of a second type of content available from the second component. The processing device ranks the first component and the second component. The processing device generates message data representing an inquiry with respect to choosing the first content data verses the second content data. The message data may include text data, audio data and/or image data. Processing logic receives second text data and determines that the second text data represents a selection of the first content data. The processing logic then causes the first component to output the first content data.

In some embodiments, a CR system receives intent data and first entity data identified from user input data (e.g., text data generated from audio data representing an utterance), wherein the first entity data is associated with the intent data. The CR system determines that the first entity data comprises music-related data, wherein a music component comprises music associated with the music-related data. The CR system further receives text data representing the user input data (e.g., text of the audio data representing the utterance) and determines a word in the text that matches a keyword associated with a trending story provided by a news component. The CR system ranks the music component and the news component. The CR system then generates message data that comprises a headline of the trending story and a question asking for confirmation to output at least one of the trending story or the music associated with the music-related data. The message data may be text data that is converted into audio data, which is then output. In response to the output of the audio data, the CR system receives new user input data (e.g., new audio data representing a new utterance) and determines that the new utterance comprises a request to output the trending story. The CR system then causes the news component to output the trending story.

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. ASR and NLU may be used together as part of a speech processing system.

Embodiments are described herein with reference to a VUI. However, it should be understood that embodiments described with reference to a VUI work equally well with other types of natural language user interfaces. For embodiments that implement a CR system for a text based natural language user interface, described operations with regards to converting audio data to text data and converting text data to audio data may be omitted.

Additionally, embodiments are described with reference to receiving audio data that represents an utterance and generating text data based on the audio data. In embodiments in which a natural language user interface other than a VUI are used, other types of user input data other than audio data may also be received and operated on. For example, user input data may include text data that represents a user input. It should be understood that embodiments described herein with reference to audio data and utterances also apply to other types of user input data.

Figure 1B:
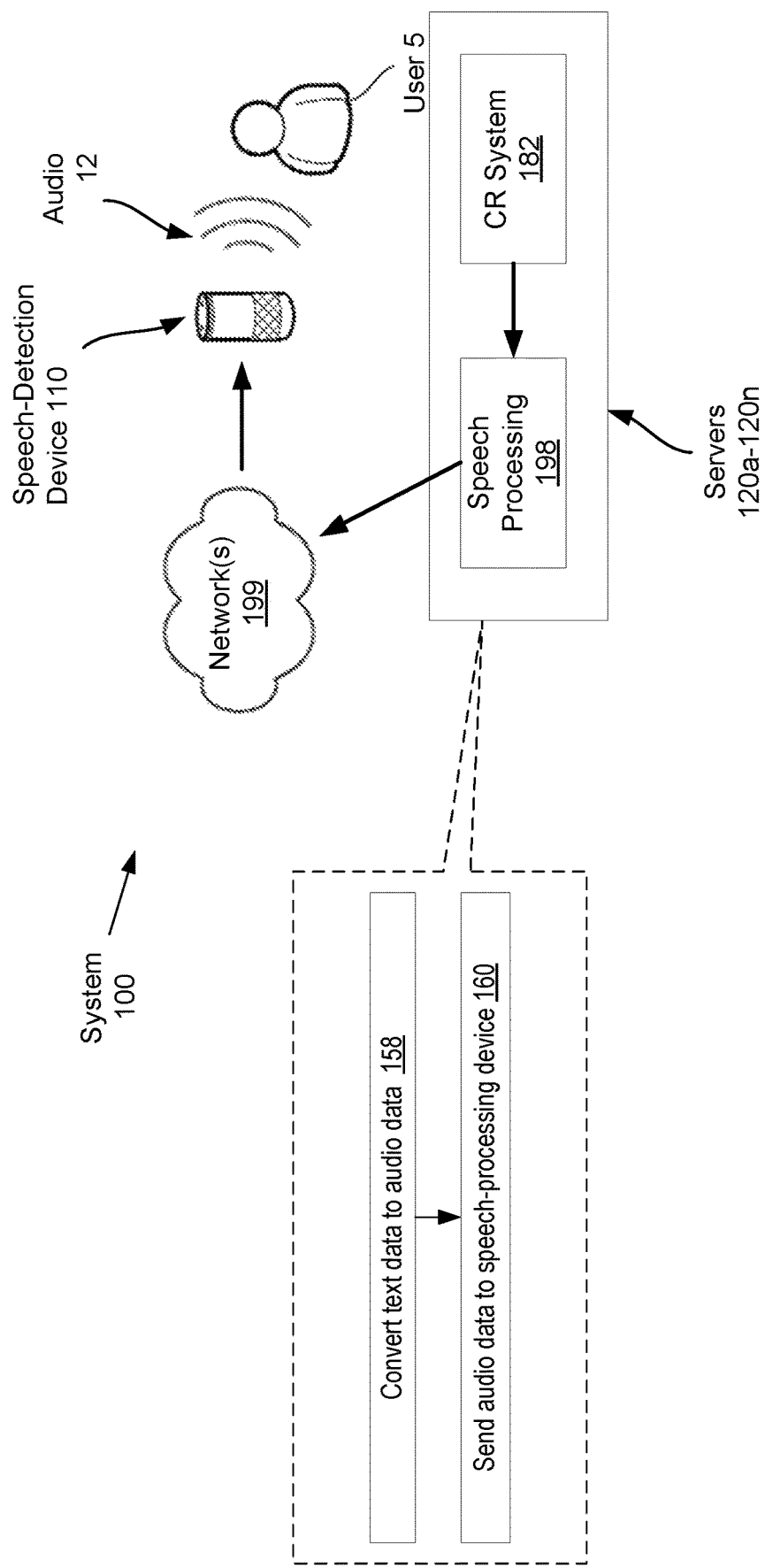
Figure 1C:
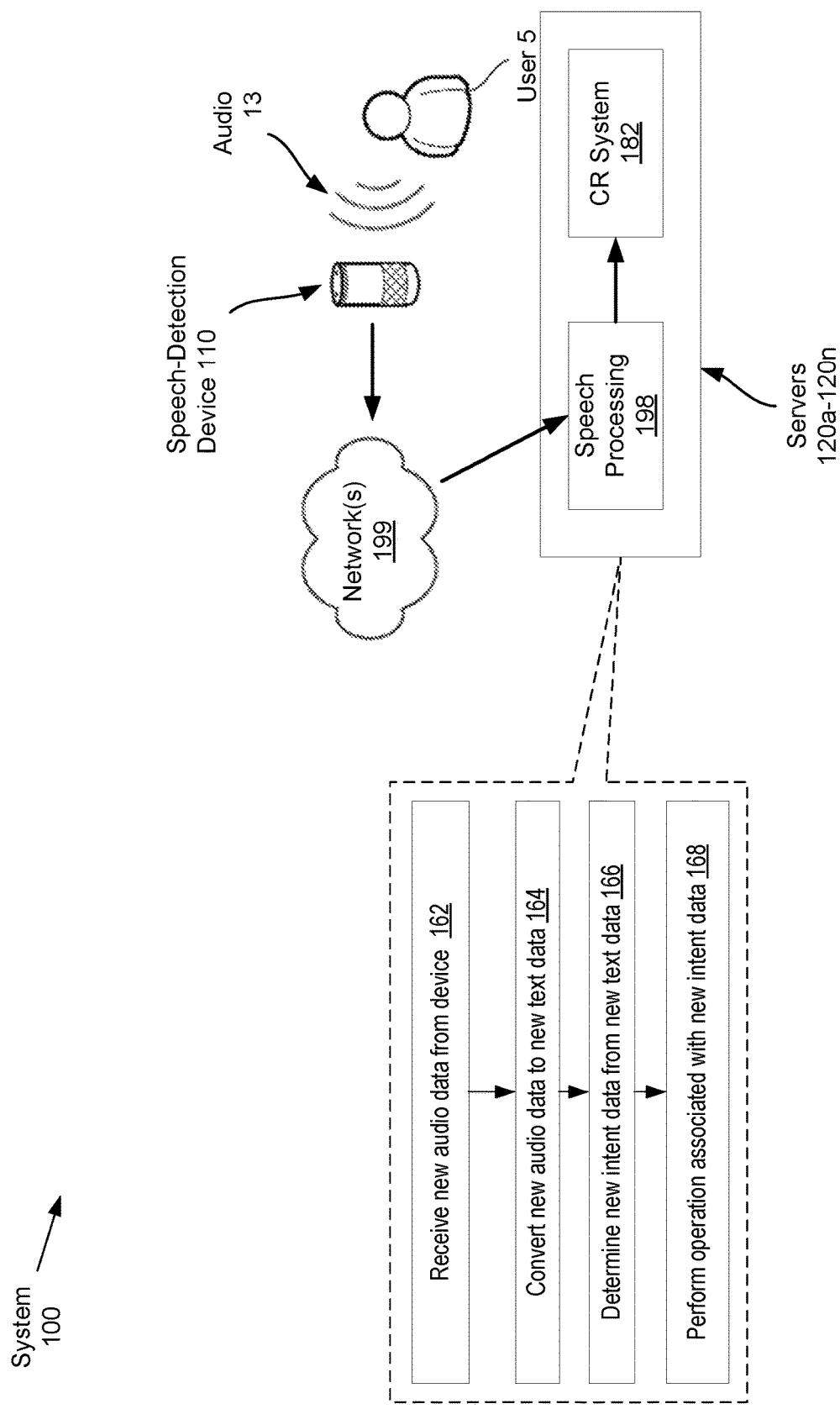

FIG. 1A-1C show a system 100 configured to perform operations using audio data, in accordance with some embodiments of the present disclosure. Although the figures and discussion illustrate certain operations of the system 100 in a particular order, the operations described may be performed in a different order (as well as certain operations removed and/or added) without departing from the intent of the disclosure. As shown in FIGS. 1A-1C, a speech-detection device 110 or other client device, and servers 120a-n may be in communication over one or more networks 199. The servers 120a-n (which may be one or more different physical devices) may be capable of performing traditional speech processing (e.g., ASR, NLU, command processing, etc.) as well as other operations as described herein. One or more of the servers 120a-n may include a speech processing component 198 and a conversational recovery (CR) system 182, both of which are described in greater detail below with reference to FIGS. 2A-4. A single server 120a may perform all speech processing or multiple servers 120a-n may combine to perform all speech processing. Further, the servers 120a-n may execute certain commands, such as answering spoken utterances of users 5, performing actions requested by users 5, and operating other devices (e.g., light switches, appliances, etc.). In some embodiments, servers 120a-n include a first server 120a or set of servers that perform speech processing, a second server 120b or set of servers that include one or more command processors, through an nth server 120n or set of servers that include one or more components that each provide distinct functionality (e.g., that provide a distinct service). Alternatively, a single server may include both a speech processing system and one or more components. In addition, certain speech-detection and/or command execution functions may be performed by the speech-detection device 110.

A speech-detection device 110 may be a device that captures audio 11 including a spoken utterance of a user 5 via a microphone or microphone array of the speech-detection device 110. The speech-detection device 110 may be, for example, a dedicated speech-detection device that includes a VUI but lacks other user interfaces such as a graphical user interface (GUI). The speech-detection device 110 may also be a device such as a mobile phone, tablet computer, laptop computer, desktop computer, etc. that includes a speech-detection application that causes the device to function as a speech-detection device. The audio 11 may include a voice activation command for the speech-detection device 110, which may place the speech-detection device 110 into a listening mode. The audio 11 may additionally include an additional command, a question and/or other utterance. While in the listening mode, the speech-detection device 110 activates one or more microphones that captures the audio 11 comprising the additional command, question and/or other utterance and sends the captured audio to the one or more servers 120a-n. In some embodiments, devices other than speech-detection devices may be used. Such other devices (e.g., tablet computers, desktop computers, laptop computers, mobile phones, etc.) may provide other types of NLUIs, such as a text based NLUI or a graphical NLUI.

Referring to FIG. 1A, processing logic of the one or more servers 120a-n receives the captured audio data from the speech-detection device 110 at block 142. At block 144, speech processing 198 converts the audio data to text data. At block 146, the speech processing 198 determines intent data and associated entity data from the text data. The intent data may be an ambiguous intent such as a content only intent that includes a noun but no verb or action word. For example, the intent data may comprise a content only intent that lacks an action to be performed on the entity data. The intent data may also represent an intent that was determined to be associated with a particular component that was then unable to act on the intent data and entity data. The operations of block 144-146 are described in greater detail below with reference to FIGS. 2A-3.

Rather than the servers 120a-n failing and outputting a failure response to the user 5, processing logic of the servers 120a-n may invoke CR system 182, and the CR system 182 may attempt to determine one or more operations to perform based on the intent data, the entity data and/or text data of the utterance. At block 148, the CR system 182 processes the intent data and entity data. At block 150, the CR system 182 determines that the entity data represents first content data of a first type of content available from a first component. For example, the first type of content may include music-related content available from a music component, video-related content available from a video component, skills-related content associated with one or more skill, and so on. A skill may be an application that performs a specific function or set of related functions. Additionally, the entity data may include a first entity that is associated with a first component, a second entity that is associated with a second component, and so on. In some embodiments, the CR system 182 generates an N-best list of N highest ranked intents, where each of the highest ranked intents may include an associated entity data. N may be an integer value that has a value of 1 or greater (e.g., 1, 2, 3, 4, 5, 10, etc.).

At block 152, the CR system 182 additionally parses the text generated from the audio data or other user input data and determines whether any words represented by the text data match keywords associated with second entity data associated with a second component, wherein the second entity data represents second content data of a second type of content available from the second component. For example, the CR system 182 may determine whether a term in the text data matches any keyword associated with any trending story provided by a news component.

Based on the operations of blocks 150 and 152, the CR system 182 generates a list of possible components that could potentially provide the user with an experience that the user 5 expects. At block 154, the CR system 182 ranks the possible components. Components may be ranked based on a defined ranking function and/or based on prior feedback of the user 5 and/or other users. For example, a first ranking rule may indicate that a news component be assigned a higher rank than a music component. The term "higher rank" may be used to show preference between two components. The term "higher rank" may not indicate an actual number value associated with the ranked component. For example, a higher ranked component may have a higher number value than a lower ranked component if the highest number value is associated with a most preferred component. Alternatively, a higher ranked component may have a lower number value than a lower ranked component if the lowest number value is associated with a most preferred component. In another example, a first ranking rule may indicate that a music component be assigned a higher rank than a news component. If prior feedback for the user 5 and/or for a statistically large group of users has favored a particular component, then that particular component may be assigned a highest rank. In some embodiments, the CR system 182 includes ranking rules that are specific to particular keywords, entity data, user accounts, users, and/or components.

At block 156, the CR system 182 generates message data that represents an inquiry with respect to choosing the first content verses the second content. The message data may include text data, audio data and/or image data. For example, the message data may comprise a question asking for confirmation to output the first content available from the first component and/or to output the second content available from the second component. The message data may list the top ranked components/content and ask which of the top ranked components/content the user 5 would like to select. Alternatively, the message data may include text or audio asking whether the top ranked component/content is desired without mentioning next highest components/content. The message data may be text data in one embodiment.

Referring to FIG. 1B, at block 158 speech processing 198 may convert the text data to audio data. At block 160, servers 120a-n may then send the audio data to speech-detection device 110. Speech detection device 110 may then output audio 12 based on the audio data. The audio may ask the user, for example, for confirmation to output the first and/or second content.

Referring to FIG. 1C, the user speaks a new utterance that is included in audio 13, which is captured by speech-detection device 110. The new utterance may say, for example, "yes". Speech-detection device 110 then sends new audio data to servers 120a-n. At block 162, speech processing 198 receives the new audio data. At block 164, speech processing 198 converts the new audio data to new text data. The CR system 182 may then determine from the new text data of the new audio data representing the new utterance what experience to provide to the user 5 at block 166. This may include determining new intent data based on the new text data. At block 168, the CR system 192 may then perform one or more operations associated with the new intent data to provide the determined experience to the user 5.

Figure 2A:
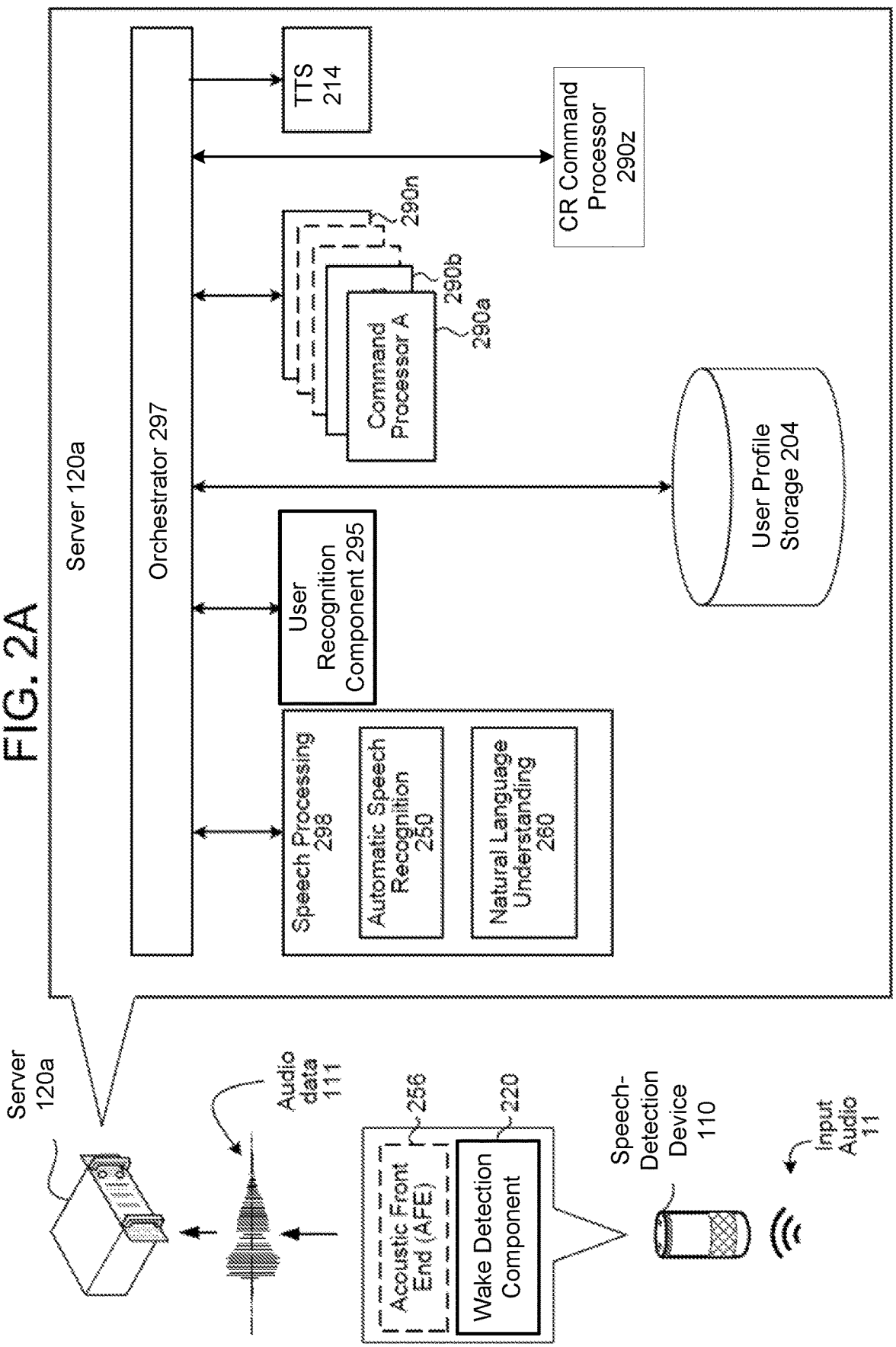
FIG. 2A is a diagram of components of a speech processing system according to embodiments of the present disclosure.
Figure 2B:
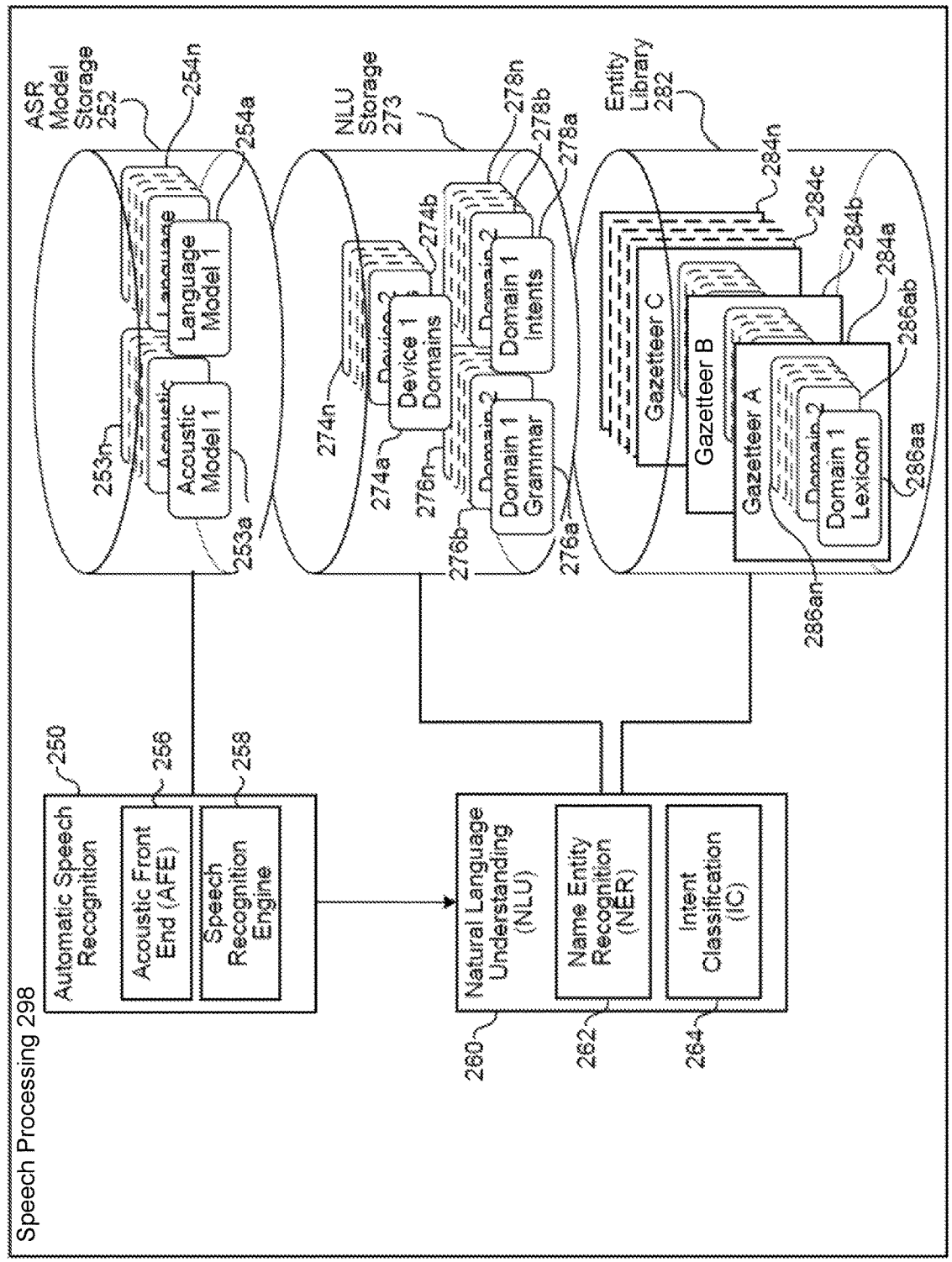
FIG. 2B is a diagram of components of a speech processing system according to embodiments of the present disclosure.

The system 100 may operate using various speech processing components as described in FIGS. 2A, 2B, 3 and 4. The various components illustrated may be located on the same and/or different physical devices. Communication between various components illustrated in FIGS. 2A-4 may occur directly and/or across a network(s) 199. Referring to FIGS. 2A-B, an audio capture component, such as a microphone (or array of microphones) of the speech-detection device 110, captures input audio 11 corresponding to a spoken utterance. The speech-detection device 110, using a wakeword detection component 220, processes audio data corresponding to the input audio 11 to determine if a keyword (such as a wakeword) is detected in the audio data. Following detection of a wakeword, the speech-detection device 110 sends audio data 111, corresponding to the utterance, to a server(s) 120a-n for processing. The audio data 111 may be output from an acoustic front end (AFE) 256 located on the speech-detection device 110 prior to transmission, or the audio data 111 may be in a different form for processing by a remote AFE 256, such as the AFE 256 located with an ASR component 250 of the server(s) 120a-n.

The wakeword detection component 220 works in conjunction with other components of the speech-detection device 110, for example a microphone to detect keywords in audio data corresponding to the input audio 11. For example, the speech-detection device 110 may convert input audio 11 into audio data, and process the audio data with the wakeword detection component 220 to determine whether speech is detected, and if so, if the audio data comprising speech matches an audio signature and/or model corresponding to a particular keyword.

The speech-detection device 110 may use various techniques to determine whether audio data includes speech. Some embodiments may apply voice activity detection (VAD) techniques. Such techniques may determine whether speech is present in audio data based on various quantitative aspects of the audio data, such as a spectral slope between one or more frames of the audio data; energy levels of the audio data in one or more spectral bands; signal-to-noise ratios of the audio data in one or more spectral bands; or other quantitative aspects. In other embodiments, the speech-detection device 110 may implement a limited classifier configured to distinguish speech from background noise. The classifier may be implemented by techniques such as linear classifiers, support vector machines, and decision trees. In still other embodiments, Hidden Markov Model (HMM) and/or Gaussian Mixture Model (GMM) techniques may be applied to compare the audio data to one or more acoustic models in speech storage, which acoustic models may include models corresponding to speech, noise (such as environmental noise and/or background noise), and/or silence. Still other techniques may be used to determine whether speech is present in audio data.

Once speech is detected in the audio data, the speech-detection device 110 may use the wakeword detection component 220 to perform wakeword detection to determine when a user intends to speak a command to the speech-detection device 110. This process may also be referred to as keyword detection, with the wakeword being a specific example of a keyword. Specifically, keyword detection is typically performed without performing linguistic analysis, textual analysis, and/or semantic analysis. Instead, audio data is analyzed to determine if specific characteristics of the audio data match preconfigured acoustic waveforms, audio signatures, and/or other data to determine if the incoming audio data "matches" stored audio data corresponding to a keyword.

Thus, the wakeword detection component 220 may compare audio data to stored models and/or data to detect a wakeword. One approach for wakeword detection applies general large vocabulary continuous speech recognition (LVCSR) systems to decode audio signals, with wakeword searching conducted in resulting lattices and/or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in a decoding graph, and the decoding output is further processed to make the decision on keyword presence. This approach can be extended to include discriminative information by incorporating a hybrid deep neural network (DNN)-HMM decoding framework. In another embodiment, the wakeword spotting system may be built on DNN/recursive neural network (RNN) structures directly, without MINI involved. Such a system may estimate the posteriors of wakewords with context information, either by stacking frames within a context window for DNN, and/or using RNN. Follow-on posterior threshold tuning and/or smoothing is applied for decision making. Other techniques for wakeword detection, such as those known in the art, may also be used.

Once the wakeword is detected in the audio data, the speech-detection device 110 may "wake" and begin transmitting audio data 111 corresponding to input audio 11 to server 120a for speech processing (e.g., for purposes of executing a command in the speech). The audio data 111 may include data corresponding to the wakeword, and/or the portion of the audio data corresponding to the wakeword may be removed by the speech-detection device 110 prior to sending the audio data 111 to the server 120a. The audio data 111 may additionally include a voice command, question and/or other utterance.

Upon receipt by the server 120a, an orchestrator component 297 sends the audio data 111 to a speech processing component 298, and namely an ASR component 250 of the speech processing component 298. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledgebase (i.e., an ASR model storage 252). For example, the ASR component 250 may compare the audio data 111 with models for sounds (e.g., subword units and/or phonemes) and sequences of sounds to identify words that match the sequence of sounds spoken in the utterance of the audio data 111.

The different ways a spoken utterance may be interpreted (i.e., the different hypotheses) may each be assigned a respective probability/confidence score representing a likelihood that a particular set of words matches those spoken in the utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text data corresponding to the audio data 111. The ASR component 250 may also output multiple hypotheses in the form of a lattice and/or an N-best list with each hypothesis corresponding to a confidence score and/or other score (e.g., such as probability scores, etc.).

The server 120a including the ASR component 250 may include an AFE 256 and a speech recognition engine 258. The AFE 256 transforms audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector and/or audio feature vector) representing features/qualities of the audio data 111 within each frame. In one configuration, each audio frame includes 25 ms of audio data and the frames start at 10 ms intervals resulting in a sliding window where adjacent audio frames include 15 ms of overlapping audio data. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, and/or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-detection device 110 may process audio data 111 into feature vectors (e.g., using an on-device AFE 256) and transmit the feature vector data to the server 120a, across the network(s) 199, for ASR processing. Feature vector data may arrive at the server 120a encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output text data representing speech that makes sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results (i.e., text data representing speech) may be sent by the speech recognition engine 258 to the orchestrator 297 and/or other processing components, which may be local to the device performing ASR and/or distributed across the network(s) 199. For example, ASR results in the form of a single textual representation of the speech, an N-best list including multiple hypotheses and respective scores, lattice, etc. may be sent from the ASR component 250 to an NLU component 260 directly and/or indirectly through the orchestrator component 297.

The device performing NLU processing (e.g., the server 120a) may include various components, including potentially dedicated processor(s), memory, storage, etc. The device performing NLU processing may include a dedicated NLU component 260, which may include a named entity recognition (NER) component 262 that determines entities from received text of utterances and an intent classification (IC) component 264 that determines user intent from text of utterances. The device performing NLU processing may additionally include NLU storage 273, and a knowledgebase (not illustrated). The knowledgebase is a database and/or other information storage that may include information about entities that may be used in resolving spoken utterances. The NLU component 260 may also utilize gazetteer information 284 stored in an entity library storage 282. The knowledgebase and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), and/or may be organized in a variety of other ways. Domain, as used herein, may refer to a category of content, such as music, videos, weather, etc. Each domain may be associated with a particular component. For example, a music component may be associated with a music domain, a video component may be associated with a music domain, a weather component may be associated with a weather domain, and so on.

The NLU component 260 takes text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent data and/or a desired action from the user as well as the pertinent pieces of information in the text data that allow a device (e.g., the speech-detection device 110, the server 120a, etc.) to complete that action (e.g., entity data associated with the intent data). For example, if a spoken utterance is processed using the ASR component 250, which outputs the text data "play Katy Perry", the NLU component 260 may determine the user intended to activate a music component in order for the music component to play music by Katy Perry.

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "play Katy Perry," the NLU component 260 may tag "play" as a command (e.g., to execute a music component to play music) and may tag "artist: Katy Perry" as a specific entity and target of the command.

To correctly perform NLU processing of an utterance, the NLU component 260 may be configured to determine a "domain" of the utterance so as to determine and narrow down which components offered by an endpoint device (e.g., the server(s) 120a-n, the speech-detection device 110, etc.) may be relevant. For example, an endpoint device may offer components relating to interactions with a telephone component, a contact list component, a calendar/scheduling component, a music player component, a verification component, a knowledgebase component, a news component, a video component, etc. Words in text data may implicate more than one component, and some components may be functionally linked (e.g., both a telephone component and a calendar component may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-detection device 110 may be associated with domains for music, telephony, calendaring, contact lists, knowledgebase, skills, videos, and device-specific communications. In addition, the entity library 282 may include database entries about specific components on a specific device, either indexed by Device ID, User ID, Household ID, and/or some other indicator.

A domain may represent a discrete set of activities having a common theme, such as "news", "music", "skills", "videos," etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both news and music, the utterance may be NLU processed using the grammar models and lexical information for news, and may also be processed using the grammar models and lexical information for music. The responses to the spoken utterance produced by each set of models is scored, with the overall highest ranked result from all applied domains being ordinarily selected to be the correct result.

The IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a music domain may include a database of music content available to a particular user account.

The intent data identified by the IC component 264 are linked to domain-specific grammar frameworks (included in grammar models 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object and/or object modifier with those identified in the database(s).

This process includes semantic tagging, which is the labeling of a word and/or combination of words according to their type/semantic meaning. Parsing may be performed using heuristic grammar rules, and/or the NER component 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent data are then used to determine what database fields should be searched to determine the meaning of these phrases, such as searching a user's gazetteer for similarity with the framework slots. So a framework for a "play music" intent data might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged word and/or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-detection device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. For example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the ASR component 250 may also be sent to a user recognition component 295 either directly and/or indirectly through the orchestrator component 297. Alternatively, the user recognition component 295 may be implemented as part of the ASR component 250. The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 2 may also include a confidence component that determines an overall confidence as the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 to stored biometric data of users. User recognition may further involve comparing image data including a representation of a feature of a user with stored image data including representations of features of users. It should be appreciated that other kinds of user recognition processes, including those known in the art, may be used.

Output from the NLU processing, which may include tagged text data, commands, intent data, entity data, etc., and output of the user recognition component 295 (e.g., a unique ID of a user) may be sent to a command processor 290a-n, which may be located on a same and/or separate server 120a-n as part of the system 100. The system 100 may include more than one command processor 290a-n, and the command processor(s) 290a-n may be determined based on the NLU output. For example, if the NLU output includes a command to play music, the command processor 290a-n selected may correspond to a music playing application and/or music component, such as one located on the speech-detection device 110 and/or in a music playing appliance. In another example, if the NLU output includes a command to read an article about a topic, the command processor 290a-n selected may correspond to a news domain and/or news component. Many such command processors 290a-n may be available to the system 100 depending on the various applications that may be invoked. In some embodiments, a music command processor 290a may be associated with a music component, a news command processor 290b may be associated with a news component, a skills command processor 290c may be associated with a skills component, a knowledgebase command processor 290d may be associated with a knowledgebase component, a video command processor 290n may be associated with a video component, and so on.

Output from the NLU component 260 (and optionally the user recognition component 295) may be sent to a command processor(s) 290a-n/skill either directly and/or indirectly via the orchestrator component 297. A "skill" may correspond to a domain and may be software running on a server and/or device akin to an application. That is, a skill may enable a server to execute specific functionality in order to provide data and/or produce some other output called for by a user. The system may be configured with more than one skill. For example a weather component skill may enable a server to execute a command with respect to a weather component server, a car component skill may enable a server to execute a command with respect to a taxi component server, an order pizza skill may enable a server to execute a command with respect to a restaurant server, a verification skill may enable a server to execute a command with respect to a verification component, etc. A skills command processor 290c may include logic to select an appropriate skill for handling a received intent data and entity data.

A command processor 290a-n may output text that is to be spoken to a user via speech-detection device 110. Alternatively, a command processor 290a-n may receive text from, for example, a particular component, where the text is to be spoken to a user via speech-detection device 110. The command processor 290a-n provides the text to a text to speech (TTS) engine 214, which converts the text into speech (e.g., into an audio file that contains a spoken version of the content of the text). This audio file may be, for example, a Moving Picture Experts Group Audio Layer III (MP3) audio file and/or other type of compressed or uncompressed audio file. The audio file is sent to the speech-detection device 110 and then played by the speech-detection device 110. In some embodiments, a link to the audio file (e.g., a universal resource locator (URL)) is sent to the speech-detection device, and the speech-detection device 110 accesses the link to receive the audio file.

In some embodiments, the available command processors include a CR command processor 290z. The CR command processor 290z may be registered with every type of intent data, including intent data types that no other command processors 290a-n may be registered with. The conversational recovery (CR) command processor 290z is responsible for recovering from a failed understanding of what a user wants. For example, if a determined intent data is for an ambiguous intent and/or an undeterminable event, then the intent data and entity data may be sent to CR command processor 290z.

One type of ambiguous intent data is an intent data that one or more other command processors attempted, but failed, to interpret and/or implement. For example, intent data may be sent to a command processor, and that command processor may fail to perform an operation for the user. In a further example, an utterance may state, "can you play music by Katy Perry?" Since the utterance is framed in the form of a question, the intent data that is initially created may be a knowledge base/question intent data. The knowledge base/question intent data may be sent to a knowledge-base command processor, which may be unable to answer the question. The knowledge base command processor may output a failure. Responsive to the failure output, the orchestrator may send the intent data and text data of the utterance to the CR command processor 290z, which may determine that the user wanted to play music by Katy Perry and may generate new intent data for playing music with entity data associated with Katy Perry.

One type of ambiguous intent data is a content only intent data. A content only intent data may be an intent data type that includes an entity data but that lacks an actual instruction/command/verb associated with the entity data. Accordingly, the content only intent data comprises an entity data but an unknown intent with respect to what to do with that entity data. For example, a user may provide the utterance "Katy Perry." The NLU 260 may identify an entity data of {artist: Katy Perry} associated with the music domain from the utterance, but may not be able to identify any associated user intent. Accordingly, a "content only intent data" with the entity {artist: Katy Perry} may be determined based on the utterance.

If orchestrator 297 is unable to determine another appropriate command processor 290a-n to process a determined intent data and entity data, then orchestrator 297 may provide the intent data and entity data to the CR command processor 290*z*. Additionally, if orchestrator 297 selects another command processor 290*a-n* and that other command processor 290*a-n* is unable to determine what a user wants (e.g., it fails out), then that other command processor may forward the intent data and entity data to CR command processor 290*z*. Alternatively, the other command processor 290*a-n* may indicate a failure to orchestrator 297, and the orchestrator 297 may then send the intent data and entity data to CR command processor 290*z*.

The NLU operations described herein may take the form of a multi-domain architecture, such as that illustrated in FIG. 3. In the illustrated architecture, each domain (which may include a set of intent data and entity slots that define a larger concept such as music, video, news, messaging, etc. as well as components such as trained models, etc. used to perform various NLU operations such as NER, IC, or the like) may be constructed separately and made available to the NLU component 260 during runtime operations where NLU operations are performed on text data (such as text data output from the ASR component 250). Each domain may have specially configured components to perform various steps of the NLU operations.

For example, the multi-domain architecture may consist of multiple domains for intents/commands executable by the system 100 (or by other devices connected to the system 100), such as music, video, messaging, and information (knowledgebase). The NLU component 260 may include a plurality of domain recognizers 335, where each domain may include its own recognizer 263. Each recognizer 263 may include various NLU components such as an NER component 262, IC component 264, and other components such as an entity resolver, etc.

For example, a music domain recognizer 263-A may have an NER component 262-A that identifies what slots (i.e., portions of input text data) may correspond to particular words relevant to the music domain. The slots may correspond to entities such as (for the music domain) a performer, album name, song name, etc. An NER component 262 may use a machine learning model, such as a domain specific conditional random field (CRF) to both identify the portions of text data corresponding to an entity as well as identify what type of entity corresponds to the text portion. For example, for the text "play songs by the stones," an NER component 262-A trained for a music domain may recognize the portion of text "the stones" corresponds to an entity and an artist name. The music domain recognizer 263-A may also have its own IC component 264-A that determines the intent of the utterance represented in the text data, assuming that the text data is within the proscribed domain. An IC component 264 may use a model, such as a domain specific maximum entropy classifier to identify the intent of the utterance, where the intent is the action the user desires the system to perform.

As illustrated in FIG. 3, multiple domains may operate substantially in parallel, with different domain specific components. That is, domain B for conversational recovery may have its own recognizer 263-B including NER component 262-B and IC component 264-B. Domain C for news may also have similar components in its recognizer 263-C, and so on for the different domains available to the system 100. When text data 300 (e.g., ASR output text data) is received, the same text data that is input into the NLU pipeline for domain A 263-A may also be input into the NLU pipeline for domain B 263-B, where the components for domain B 263-B will operate on the text data 300 as if the text data 300 related to domain B, the components for domain C 263-C will operate on the text data 300 as if the text data 300 related to domain C, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC component 264 may be considered part of a recognizer (such as recognizer 263-A, 263-B, etc.). The recognizers 335 may operate using machine learning trained models such as a CRF, maximum entropy classifier, neural network (such as a deep neural network (DNN) and/or recurrent neural network (RNN), and/or other classifier. The recognizers 335 may also use rules that operate on input text data in a particular form to identify named entity data and/or intent data. The recognizers 335 may also operate using a data structure such as a finite state transducer (FST) to process the text data 300 to perform NER and/or IC. Other techniques and/or models may also be used to perform NER and/or IC. The techniques may also be used together. For example, a set of rules, an FST, and a trained machine learning model may all operate on text data 300 substantially in parallel to determine the named entities/intents of an utterance represented in the text data 300. If one technique performs its task with high enough confidence, the system may use the output of that technique over the others. The system may also prioritize the results of different techniques in certain circumstances (for example rules results may be higher priority than FST results, which may be higher priority than model results, and/or some other configuration). Each recognizer (such as 263-A, 263-B, 263-C, etc.) may have its own rules, FSTs, and/or models operating such that each recognizer operates substantially in parallel to the other recognizers to come up with its own interpretation of the utterance represented in the text data 300.

The output of each recognizer may be an N-best list of intent data and slots representing the particular recognizer's top choices as to the meaning of the utterance represented in the text data 300, along with scores for each item in the N-best list. The slots may be filled with entity data in embodiments. Each recognizer of the recognizers 335 may operate on the text data 300 substantially in parallel, resulting in a number of different N-best lists, one for each domain (e.g., one N-best list for music, one N-best list for video, etc.). The size of any particular N-best list output from a particular recognizer is configurable and may be different across domains.

While the recognizers 335 perform NER (e.g., identify words of the input text data 300 that are important for downstream processing (sometimes called light slot filling), and may even label those words according to type (such as artist name, album name, city, or the like)), the recognizers 335 may not perform entity resolution (i.e., determining the actual entity corresponding to the words of the text data 300). Entity resolution is typically a higher latency process and involves communications with a knowledgebase 272 and/or other component to precisely identify the specific entities. As this process is resource intensive, it may be preferable to not perform this task for each item of every N-best list across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 of all the domains may be passed to a cross domain processing component 355, which may further rank the individual items in the N-best lists 340 as well as perform other operations.

The cross domain processing component 355 may include a cross-domain ranker 350. The cross-domain ranker 350 takes the N-best lists 340 and selects from among the lists the top choices to create a new N-best list that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list created by the cross-domain ranker 350, take the example text data 300 of "Katy Perry." The text data 300 may be processed by each of the recognizers 335, and each will output an N-best list, resulting in the group of N-best lists 340 input into the cross domain processing component 355. The cross-domain ranker 350 may then rank the individual items among the N-best lists to create a new N-best list. Each item in the cross-domain N-best list 360 may also include a score. The size of the cross domain N-best list 360 is configurable. While the cross-domain ranker 350 takes as input the N-best lists 340, it may also consider other information, such as other data 391.

The cross domain processing component 355 may also include a light slot filler component 352. The light slot filler component 352 can take text from slots and alter it to make the text more easily processed by downstream components. The operations of the light slot filler component 352 are typically low latency operations that do not involve heavy operations, such as those that require referencing a knowledgebase. The purpose of the light slot filler component 352 is to replace words with other words and/or values that may be more easily understood by downstream components. For example, if the text data 300 includes the word "tomorrow," the light slot filler component 352 may replace the word "tomorrow" with an actual date for purposes of downstream processing. Similarly, a word "CD" may be replaced by a word "album." The replaced words are then included in the cross domain N-best list 360.

The cross-domain N-best list 360 is output to a heavy slot filler and entity resolver 370. The entity resolver 370 can apply rules and/or other instructions to standardize labels and/or tokens from previous stages into an intent data/slot representation. The precise transformation may depend on the domain (for example, for a travel domain a text mention of "Boston airport" may be transformed to the standard BOS three-letter code referring to the airport). The entity resolver 370 can refer to an authority source (such as a knowledgebase 272) that is used to specifically identify the precise entity referred to in the entity mention identified in the incoming text. Specific intent data/slot combinations may also be tied to a particular source, which may then be used to resolve the text (such as by providing information and/or a command to be executed in response to a user utterance). In the example "play songs by the stones," the entity resolver 370 may reference to a personal music catalog, Amazon Music account, user profile 404, or the like. The output from the entity resolver 370 may include an altered N-best list that is based on the cross-domain N-best list 360 but also includes more detailed information about the specific entities mentioned in the text (such as specific entity IDs) and/or more detailed slot data that can eventually be used by a command processor 290 which may be incorporated into the same system components and/or pipeline and/or may be on a separate device in communication with the system. While illustrated as a cross-domain resolver, multiple entity resolvers 370 may exist where a particular entity resolver 370 may be specific for one or more domains.

As can be appreciated, the entity resolver 370 may not necessarily be successful in resolving every entity and filling every slot. This may result in incomplete results in the combined N-best list. A final ranker 390 may consider such errors when determining how to rank the ultimate results for potential execution. For example, if an item of the cross-domain N-best list 360 comes from a book domain and includes a read book intent, but the entity resolver 370 cannot find a book with a title matching the input query text, that particular result may be re-scored by the final ranker 390 to be given a lower score. Each item considered by the final ranker 390 may also be assigned a particular confidence, where the confidence may be determined by a recognizer 263, cross domain processing component 355, and/or by the final ranker 390 itself. Those confidence scores may be used to determine how to rank the individual NLU results represented in the N-best lists. The confidence scores may be affected by unfilled slots. For example, if one domain is capable of filling a slot (i.e., resolving the word in the slot to an entity and/or other recognizable form) for an input utterance, the results from that domain may have a higher confidence than those from a different domain that is not capable of filling a slot.

The final ranker 390 may be configured to apply re-scoring, biasing, and/or other techniques to obtain the most preferred ultimate result. To do so, the final ranker 390 may consider not only the NLU results of the N-best lists, but may also consider other data 391. This other data 391 may include a variety of information. For example, the other data 391 may include application rating and/or popularity data. For example, if one application has a particularly high rating, the final ranker 390 may increase the score of results associated with that particular application. The other data 391 may also include information about applications that have been specifically enabled by the user (as indicated in a user profile 204, discussed in reference to FIG. 2A). NLU results from enabled applications may be scored higher than results from non-enabled applications. User history may also be considered, such as if the user regularly uses a particular application and/or does so at particular times of day. Date, time, location, weather, type of device 110, user ID, context, and other information may also be considered. For example, the final ranker 390 may consider when any particular applications are currently active (such as music being played, a game being played, etc.). The highest scoring result (or results in the case of multiple commands being in an utterance) may be passed to a downstream command processor 290 for execution.

Following final ranking, the NLU component 260 may output NLU output data 385. The NLU output data 385 may include intent data that comprises an indicator of the intent of the utterance along with data (e.g., entity data) associated with the intent data, for example an indication that the intent is "play music" and the music to be played is "Adele." The NLU output data 385 may be in the form of previous NLU data such as an item(s) in the N-best lists 340, an item(s) in the cross-domain N-best list 360, or the like. The NLU output data 385 may also be in a format executable by the command processor 290. Multiple instances of NLU output data (e.g., 385a-385n) may also be output. In some embodiments, the NLU component 260 outputs the N-best list with intent data and associated entity data.

Figure 4:
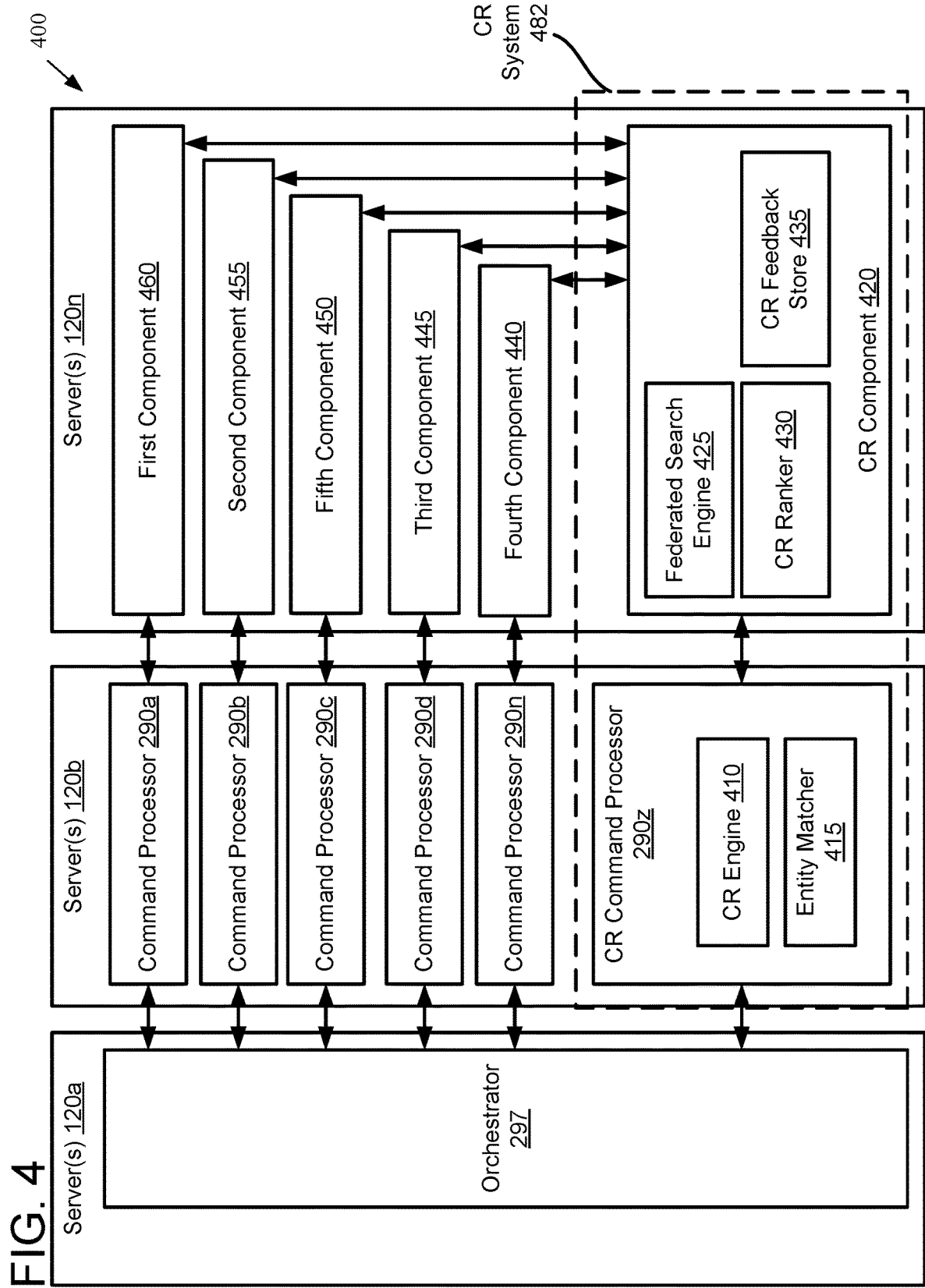
FIG. 4 is diagram of a conversational recovery system according to embodiments of the present disclosure.

FIG. 4 is a diagram of a system 400 including a conversational recovery system 482 according to embodiments of the present disclosure. The system 400 may correspond to system 100 and includes one or more servers 120a, one or more servers 120b, through one or more servers 120n. Server(s) 120a includes orchestrator 297. Server(s) 120b include command processor 290a, command processor 290b, command processor 290c, command processor 290d, command processor 290n and CR command processor 290z. In some embodiments, command processor 290a is a music command processor, command processor 290b is a news command processor, command processor 290c is a skills command processor, command processor 290d is a knowledgebase command processor, and command processor 290n is a video command processor. Server 120a may additionally contain one or more additional command processors not discussed herein, which may be operatively coupled to orchestrator 297. Server 120a may also include any of the components that were described as being included in server 120a herein above.

Server(s) 120n may include multiple different components, which may include a first component 460, second component 455, fifth component 450, third component 445, fourth component 440 and CR component 420. In an example, the first component 460 is a music component, the second component 455 is a news component, the third component 445 is a knowledgebase component, the fourth component 440 is a video component and the fifth component 450 is a skills index. These components 420, 440, 445, 450, 455, 460 as well as additional components may all be on a single server 120n and/or may be on different servers 120n. Additionally, one or more of the components 420, 440, 445, 450, 455, 460 may be included on servers 120a and/or server(s) 120b. Additionally, one or more of the command processors 290a-z may be included on server(s) 120a. First component 460 may be a music component that is part of a music domain and that communicates with command processor 290a, which may be a music command processor. Second component 455 may be a news component that is part of a news domain and that communicates with command processor 290b, which may be a news command processor. Fifth component 450 may be a skills index that is part of a skills domain and that communicates with command processor 290c, which may be a skills command processor. Third component 445 may be a knowledgebase component that is part of an information (e.g., knowledgebase) domain and that communicates with command processor 290d, which may be a knowledgebase command processor. Fourth component 440 may be a video component that is part of a video domain and that communicates with command processor 290n, which may be a video command processor. CR component 420 is part of a CR domain and communicates with CR command processor 290z.

In some embodiments, CR command processor 290z and CR component 420 together make up a CR system 482. The CR system 482 is responsible for recovering from conversational failures (e.g., failures of a VUI or other NLUI) associated with any of the other components and/or domains and/or with the NLU. In embodiments the components of the CR component 420 may be integrated into the CR command processor 290z.

CR command processor 290z includes a CR engine 410 and an entity matcher 415. CR command processor 290z may receive intent data and entity data from orchestrator 297 responsive to any of the other command processors 290a-n and/or components 440-460 failing to understand what a user wants. For example, the utterance "Can you play Katy Perry" may cause orchestrator to determine an information request intent with a "play Katy Perry" content and provide this intent data and entity data to a knowledgebase command processor. The knowledgebase command processor may then be unable to answer the question, and may output a failure (e.g., an "I don't know" result). Rather than returning the failure of the knowledgebase command processor to the user, orchestrator 297 may send the intent data and entity data to CR command processor 290z, which may determine that a user intent is to play music by Katy Perry. Additionally, CR command processor 290z may receive intent data and entity data from orchestrator 297 if no other command processors 290a-n are registered for the determined class of intent (e.g., content only intent). When intent data and entity data is sent to CR command processor 290z, the intent data and entity data may be accompanied by text data of the utterance from which the intent data and entity data was generated. In some embodiments, CR command processor 290z receives an N-best list, which may include a ranked series of intent data and associated entity data.

In some embodiments, CR command processor 290z includes an entity matcher 415 and a CR engine 410, and CR component 420 includes a federated search engine 425, a CR ranker 430 and a CR feedback store 435. CR command processor 290z may periodically receive keyword data from one or more component (e.g., every 15 minutes, every half hour, every hour, every day, etc.), such as from second component 455. Each keyword in the keyword data may be associated with a particular entity. For example, each keyword may be associated with one or more trending articles available from the second component 455. Entity matcher 415 may parse the text data of user input data (e.g., from audio data representing an utterance) and compare each word in the text data to keywords received from one or more components (e.g., keywords associated with trending articles from second component 455). From the one or more matches of words in the text data to keywords, entity matcher 415 may determine a highest ranked entity associated with one or more components. For example, entity matcher 415 may determine a highest ranked trending news article from second component 455. Matches may be made between multiple words of the text and multiple keywords associated with an entity. The entity matcher 415 may determine a confidence score for a matched entity based on, for example, a number of words from the text that match keywords associated with the same entity data. In some embodiments, a determination may be made as to whether the confidence score associated with an entity data exceeds a confidence threshold. If the confidence score exceeds the confidence threshold, then entity matcher 415 may determine that a component associated with the entity data is a candidate component. In some embodiments, CR command processor 290z may retain received keywords for a time period, such as for 24 hours. After the time period is expired, the keywords may be removed from a keyword list and/or cache.

Federated search engine 425 searches for domains/components that may provide experiences associated with a user utterance. For example, federated search engine 425 may search a skills index for a match to text and/or received entity data. Each skill may be associated with one or more keywords in a skills index. Federated search engine 425 may search for matches between words of the text data and keywords associated with skills and/or between entity data and entities associated with skills. A skill having a best match to the words from the text and/or the entity data may be determined. In some embodiments, federated search engine 425 performs a search by generating a search query and sending the search query to one or more components 440-460. The search query may include the text of the utterance and/or a portion of the text of the utterance.

The skill index may maintain a data structure (e.g., a list or table) that comprises entries associated with skills. The entry for a skill may additionally include one or more previous utterances that resulted in the skill having been invoked. The text data may be compared to the text of previous utterances stored in the skills index. If the text data of the utterance is similar to one or more examples of text data for previous utterances that are associated with a specific skill, then that specific skill may be identified. Text data generated from audio data representing a previous utterance or other previous user input data may be associated with a skill if the user input data resulted in that skill being executed. In such an instance, the skills component may be selected as a candidate component by federated search engine 425. A similarity score may be computed based on a semantic similarity between the text data of the user input data and the text data associated with one or more previous user input data, based on a number of matching words are identified between the text data associated with the user input data and the text data of one or more previous user input data, and/or based on other criteria. In some embodiments, a confidence score is determined based on the similarity score. In some embodiments, the skill index is searched by generating a query comprising the text data (or a subset of the text data) and sending the query to the skill index. The skill index may then respond with one or more search results and/or with a highest ranked search result (e.g., that indicate a highest ranked skill and/or other highest ranked entity and/or content). The response from the skill index may additionally include a confidence score for the highest ranked search result.

In some embodiments, federated search engine 425 generates a confidence score for one or more of the determined domains/components. The confidence score may be a confidence that the particular entity data associated with content available from a component is relevant to the utterance. For example, a confidence score may be determined based on a degree of match (similarity) between text of the utterance and text associated with entity that data is in turn associated with a component.

Additionally, the received entity data may be associated with one or more specific domains and/or components. For example, a content only intent may be accompanied with entity data associated with a music domain (e.g., music-related data such as musician, album, song, etc.), video domain (e.g., movie-related data such as a movie), etc. For each component/domain associated with received entity data, federated search engine 425 may note the associated component/domain.

After federated search engine 425 determines the possible domains/components to satisfy a user command and/or question, CR ranker 430 ranks those possible domains/components to determine an experience and/or component to suggest to a user. CR ranker 430 may include dynamic and/or static ranking rules. CR ranker 430 may start with default ranking rules, and may then generate customized ranking rules for a user after time based on prior user feedback. CR ranker 430 may generate dynamic ranking rules based on a determination of prior feedback with respect to choosing contents available from a first component verses contents available from a second component, for example. CR ranker 430 may then rank the first component and the second component based on the generated ranking rule that is based at least in part on the prior feedback. For example, if a user has been presented with an option of playing music by a musician or reading an article associated with the musician, and has always elected to play the music and not read the article, then CR ranker may rank the music component above the news component. One or more ranking rules may take confidence scores into consideration. A component having an entity/skill with a high confidence score may be ranked above a component having an entity/skill with a low confidence score, for example.

In embodiments, different ranking rules are generated for specific keywords, entity data, components (e.g., components that failed to understand the utterance), user account and/or users. In some embodiments, a ranking rule may be selected based on the words in the text data and/or based on the received entity data. In an example, "Katy Perry" may be associated with a specific ranking rule that ranks a music component above other components.

In some embodiments, user specific and/or user account specific ranking rules are applied for a particular user. Such ranking rules for the particular user may be dynamic ranking rules that are based on previous utterances and associated previous feedback data for that particular user (e.g., as represented using a user identifier). A ranking rule for a particular user account may be a dynamic ranking rule that is based on previous utterances and associated previous feedback data associated with a particular user account (which may include multiple users).

In some embodiments, one or more ranking rules are associated with a particular command processor and/or associated component. If a particular command processor receives the intent data, entity data and/or text data and fails to understand such data and/or to perform any action for the user (e.g., fails out or otherwise fails to implement the intent), that command processor may send the intent data, entity data and/or text data to CR system 482. The received intent data and entity data may include a highest ranked intent data and entity data as well as a second highest ranked intent data and entity data as determined by the NLU. The CR command processor 290z may then select one or more ranking rules associated with the command processor from which the intent data and/or entity data was received (e.g., the command processor that failed). For example, a ranking rule may specify that for failures received from a knowledgebase command processor, a component associated with a second highest ranked intent data and/or entity data as determined by the NLU should be assigned a highest rank. The rule may further specify that the component associated with the second highest ranked intent data and/or entity data should be selected if that component is a music component.

Once CR ranker 430 has ranked the possible components/domains for a user input data, CR engine 410 may generate message data to output to a user based on the ranking. The message data may include text data, audio data and/or image data. In some embodiments, CR engine 410 generates message data comprising a question asking whether the user wants an experience associated with the highest ranked domain/component. In some embodiments, CR engine 410 generates message data comprising an inquiry that asks the user to select from two or more of the highest ranked domains/components. The message data may be text data, and the CR engine 410 may then convert the text data to audio data, and may then provide the audio data to speech-detection device 110 for output in some embodiments. Alternatively, the message data may be text data that may be sent to a graphical user interface, a text user interface, or any other NLUI. The speech detection device 110 (or other device) may then receive an answer from the user in the form of audio data representing a new utterance or other new user input data. The audio data or other user input data may be sent to CR engine 410, which may convert the audio data or other user input data to text data and then analyze the text data to determine user feedback in the new utterance (e.g., to determine the answer provided by the user). In some embodiments, the user input data is already text data, and so is not converted to text data. In some embodiments, the speech processing 298 may convert the new audio data to text data and send the text data to CR command processor 290z for analysis.

If the answer included a simple positive response (e.g., "yes", "please", "yes please", "okay", or words to that effect, then CR command processor 290z may generate new intent data associated with the highest ranked domain/component. CR command processor 290z may then send the new intent data and the entity data to that highest ranked component. If the answer included a simple negative response (e.g., "no", "nope", "I don't want that," etc.) then CR engine 410 may generate new message data comprising an inquiry asking if the user wants the experience associated with the second highest ranked component/domain, generate audio of the new message data (if the new message data is generated as text data), and output the new audio data to the user. This may continue until the user's desired course of action is determined. In some embodiments, CR command processor 290z checks to determine a number of clarifying inquiries that have been sent to the user for a particular session (e.g., responsive to an initial user command). If the number of clarifying inquiries that have been sent exceeds a threshold (e.g., a feedback limit), then CR command processor 290z fails rather than asking another question of the user. User feedback data may be stored in the CR feedback store 435 along with additional information such as the initial intent data and/or entity data, the text of the initial utterance, and/or other metadata such as time, date, device identifier (ID), user account and/or user ID, and so on. CR ranker 430 may use the data from the CR feedback store 435 to adjust ranking rules.

In an example, orchestrator 297 may pass a content only request with a music domain entity of {artist: Katy Perry} to CR command processor 290z responsive to a user command of "Katy Perry." Entity matcher 415 may determine that "Katy Perry" matches a keyword for a trending article from news component about Katy Perry. Additionally, federated search engine 425 may determine that the user has installed a skill/application associated with Katy Perry (e.g., an application that plays the Twitter feed of Katy Perry), and determine that the term "Katy Perry" matches one or more keyword associated with that skill. Additionally, federated search engine 425 may determine that the received entity data is entity data associated with content available from first component 460 (e.g., a music component). Accordingly, the possible components that may provide experiences associated with the user command include the second component 455 (e.g., the news component), the first component 460 (e.g., the music component) and a skill associated with the fifth component 450 (e.g., the skills index). CR ranker 430 may assign the news component a highest rank, the music component a second highest rank and the Katy Perry skill a lowest rank. CR engine 410 may then generate message data that includes a headline of the trending story about Katy Perry and that asks whether the user would like to hear the story. The user may respond that they do want to hear the story, and the story may then be output via audio to the speech-detection device 110 and/or to an audio system by the news command processor 290b and/or by the second component 455. In some embodiments, after the story is completed, CR engine 410 may ask whether the user wants to hear music by Katy Perry.

Figure 5A:
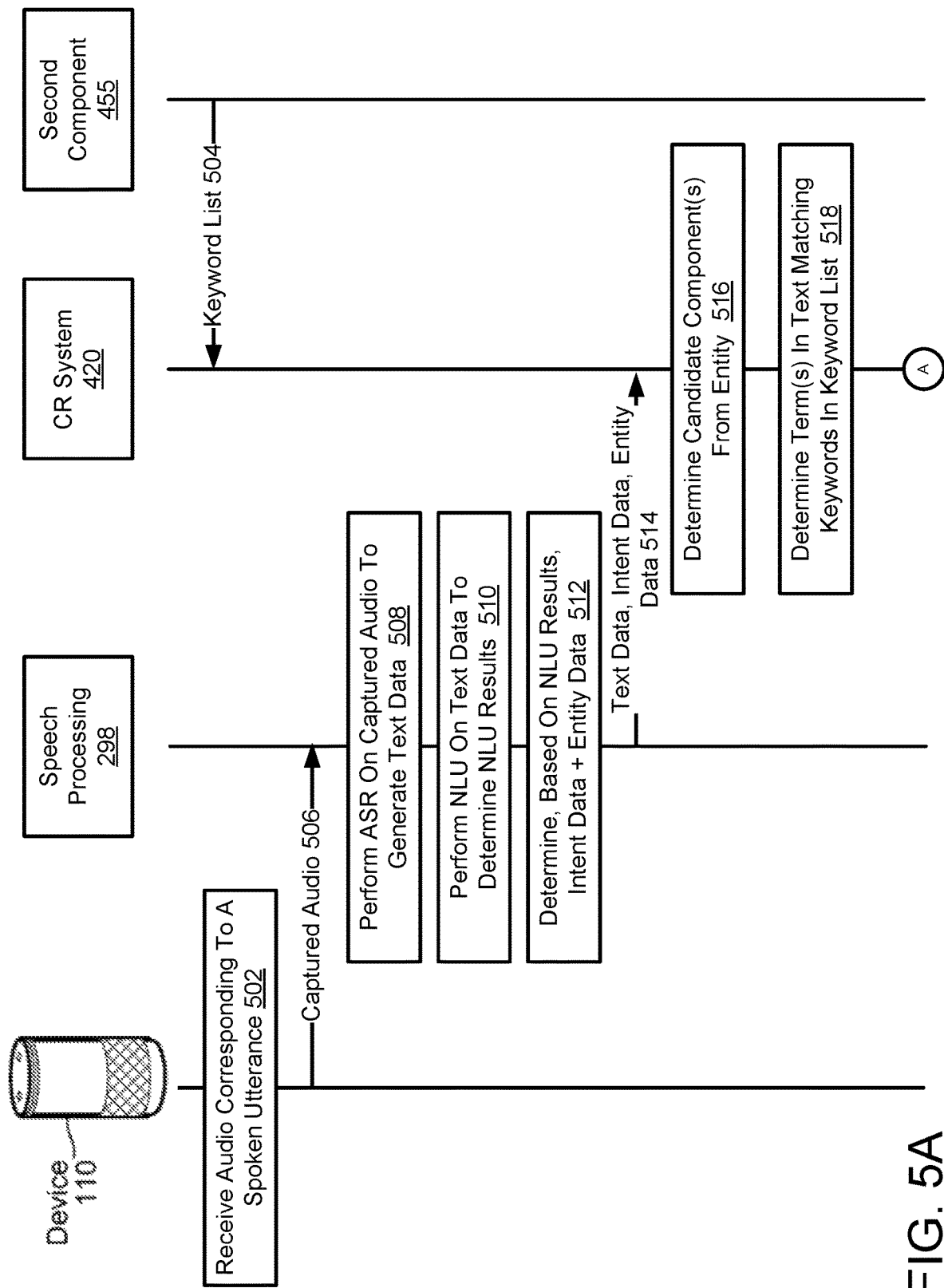
FIGS. 5A-5C are sequence diagrams illustrating conversational recovery according to embodiments of the present disclosure.
Figure 5B:
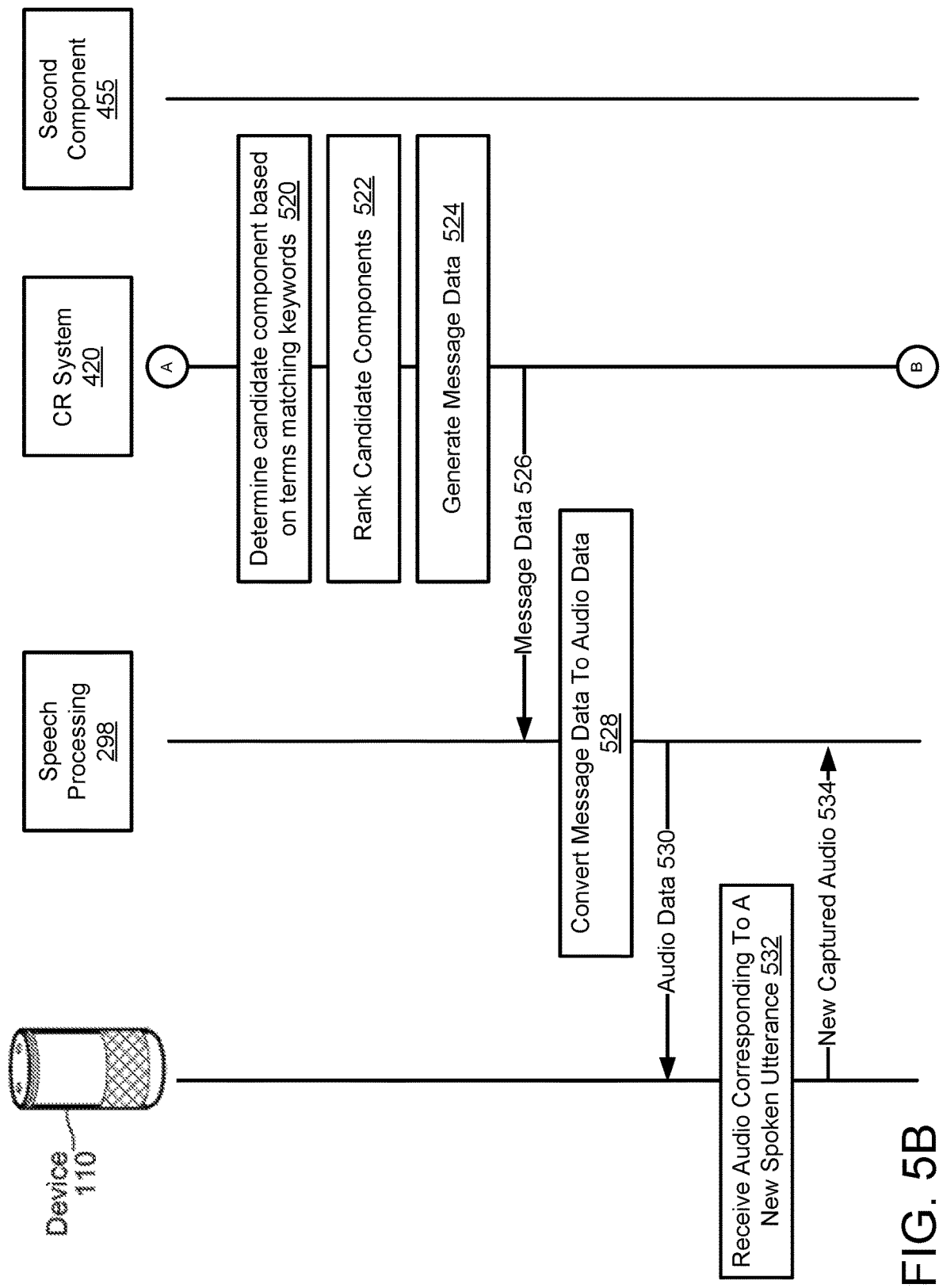
Figure 5C:
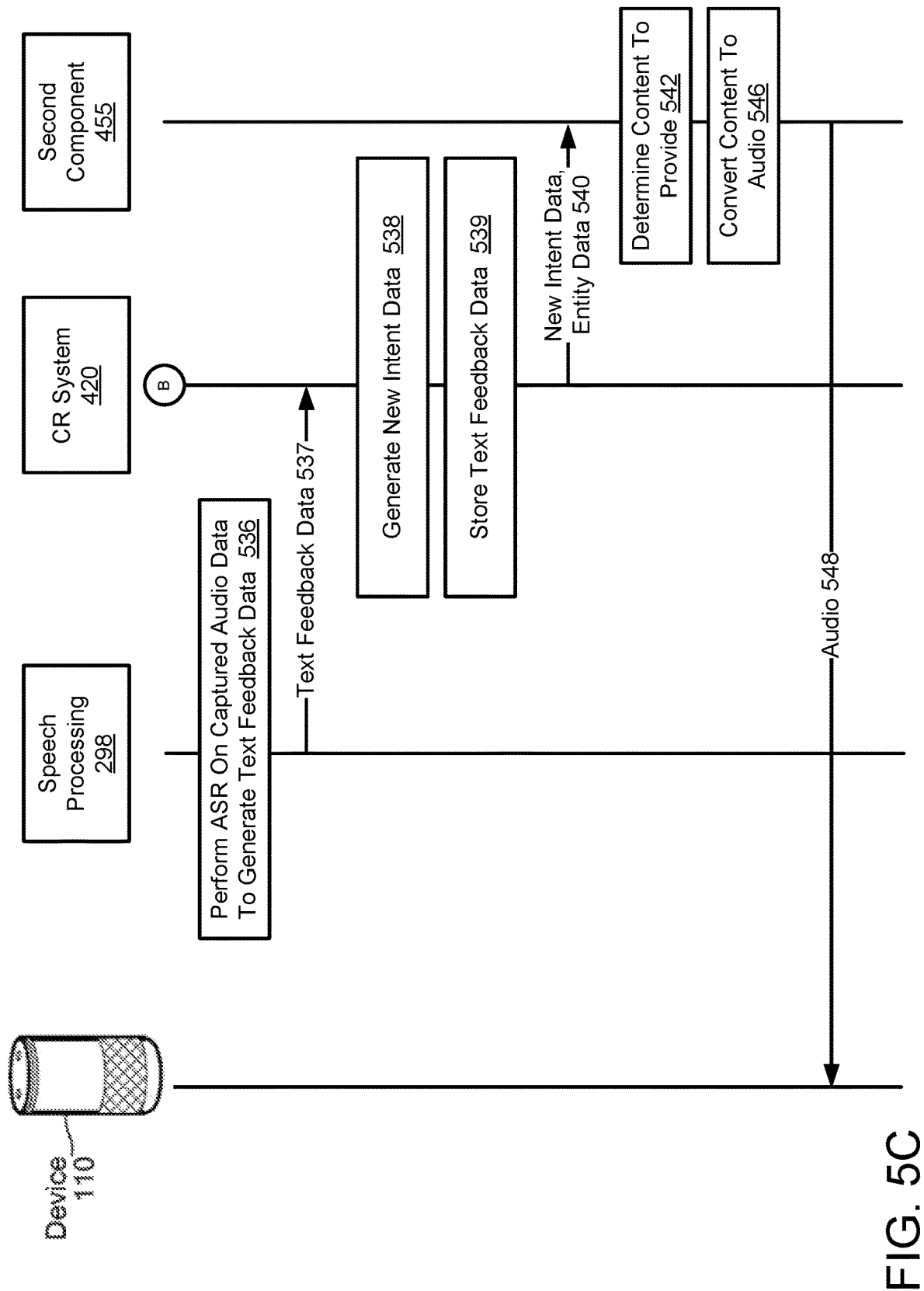

FIGS. 5A-5C are sequence diagrams illustrating conversational recovery according to embodiments of the present disclosure. To initiate the sequence, device 110 receives audio corresponding to a spoken utterance from a user at block 502. The spoken utterance may include a wakeword that causes the device 110 to wake and to start sending (e.g., streaming) captured audio data to a server computing device that includes speech processing 298. Device 110 then sends the captured audio to speech processing component 298 at block 506. Device 110 may stream audio captured by device 110 to speech processing 298.

At block 508 the speech processing component 298 performs ASR on the captured audio to generate text data (e.g., to generate text data comprising the text, "Katy Perry"). The speech processing component 298 transcribes the captured audio data into text data representing words of speech contained in the audio data. In some embodiments, a spoken utterance in the audio data is input to a processor configured to perform ASR, which then interprets the spoken utterance based on a similarity between the spoken utterance and pre-established language models stored in an ASR model knowledgebase. For example, the speech processing component 298 may compare the audio data with models for sounds (e.g., subword units and/or phonemes) and sequences of sounds to identify words that match the sequence of sounds spoken in the utterance of the audio data.

At block 510, the speech processing component 298 performs NLU on the text data to determine NLU results. In some embodiments, speech processing component 298 takes text data and attempts to make a semantic interpretation of the text data. That is, the speech processing component 298 determines the meaning behind the text data based on the individual words. The speech processing component 298 interprets a text string to derive an intent data and/or a desired action as well as the pertinent pieces of information in the text data (e.g., entity data associated with the intent data) that enable the desired action to be completed.

To correctly perform NLU processing of an utterance, the speech processing component 298 may determine one or more "domain" of the utterance so as to determine and narrow down which components (e.g., components 440-460) may be relevant. Words in text data may implicate more than one component, and some components may be functionally linked. Text data for an utterance may be processed applying the rules, models, and information applicable to each identified domain. For example, if text data potentially implicates both news and music, the text data may be NLU processed using the grammar models and lexical information for news, and may also be processed using the grammar models and lexical information for music. The responses to the text data associated with the spoken utterance produced by each set of models is scored, with the overall highest ranked result from all applied domains being ordinarily selected to be the correct result. Alternatively, multiple highest ranked results may be selected.

At block 512 the speech processing component 298 may determine, based on the NLU results, intent data and entity data. In some embodiments, speech processing component 298 parses the text data to determine intent data for each identified domain, where the intent data corresponds to the action to be performed that is responsive to the spoken utterance. The speech processing component 298 may identify potential intents for each identified domain by comparing words in the utterance to the words and phrases in an intents database.

In some embodiments, in order to generate a particular interpreted response, the speech processing component 298 applies the grammar models and lexical information associated with a respective domain. Each grammar model includes the names of entities (i.e., nouns) commonly found in speech about the particular domain (i.e., generic terms). For instance, a grammar model associated with a music domain may include a database of music content available to a particular user account.

The intent data identified by the speech processing component 298 may be linked to domain-specific grammar frameworks with "slots" and/or "fields" to be filled. However, to make recognition more flexible, these frameworks would ordinarily not be structured as sentences, but rather based on associating slots with grammatical tags. For example, the speech processing component 298 may parse the text data to identify words as subject, object, verb, preposition, etc., based on grammar rules and models, prior to recognizing named entities. The identified verb may be used to identify intent, which is then used to identify frameworks. In some instances, a spoken utterance may lack a verb. For example, an utterance may state simply, "Katy Perry," without any indication as to what should be done with relation to Katy Perry. In such an instance, speech processing component 298 may search the database of entity data associated with one or more domains using the data from the utterance (e.g., for the term "Katy Perry"). Speech processing component 298 may then generate a content only intent associated with the found content. For example, speech processing component 298 may generate a content only intent associated with entity data associated with content available from a music component (e.g., the entity data {artist: Katy Perry}).

A framework for an intent of "play" may specify a list of slots/fields applicable to play the identified "object" and any object modifier (e.g., a prepositional phrase), such as {Artist Name}, {Album Name}, {Song name}, etc. The speech processing component 298 may then search the corresponding fields in the domain-specific and personalized lexicon(s), attempting to match words and phrases in the utterance tagged as a grammatical object and/or object modifier with those identified in the database(s). As indicated above, in the case of a content only intent, one or more databases may be searched for matches to the identified "object" in the text data even though no intent has been determined.

If an intent was determined, the frameworks linked to the intent may then be used to determine what database fields should be searched to determine the meaning of these phrases. So a framework for a "play music" intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. Intent data may be generated for each possible intent.

In some embodiments, an N-best list of intent data and associated entity data is generated at block 512.

At block 514, the speech processing component 298 may pass the text data, the intent data and the entity data to CR system 420 or a component thereof (e.g., to CR command processor 290z). In some embodiments, multiple intent data and/or entity data are passed. In such an instance, the intent data and/or entity data may have an assigned ranking as determined by the NLU. This data may be passed to the appropriate CR domain along with additional metadata such as a device ID of device 110, a speaker ID of a speaker who spoke the voice command, and so on. In some embodiments, the N-best list of intent data and entity data is passed to the CR system 420.

At block 516, the CR system determines one or more candidate components (e.g., candidate services) from the received entity data and/or the received intent data. In some instances, the received entity data may be associated with a particular component. For example, received entity data for "Katy Perry" may be associated with content available from a music component. Accordingly, the received entity data may indicate candidate components in some instances. In some instances, the received entity data may be usable to search databases of components to determine if the entity data matches any content available from one or more of the components (or skill listed in a skills index). If a match is found, then the component (or skill) associated with the matching content may be a candidate component.

At block 518, the CR system additionally determines one or more terms (words) in the received text that match one or more keywords in a keyword list from a news component (or other component) at block 504. The keyword list may include multiple entries, where each entry may include an entity and one or more keywords associated with that entity. For example, a keyword list associated with a news component may include an entry for each trending article available from the news component. Each entry may additionally include one or more keywords associated with a particular entity (e.g., a particular trending article). CR system 420 may parse the received text data and compare each word from the received text data to each keyword in the keyword list. If a match is found between a word from the text data and a word from the keyword list, then the component associated with the keyword list may be a candidate component.

In some embodiments, the keyword list includes groups of words and/or phrases in addition to or instead of individual keywords. CR system 420 may compare groups of words from the text data to groups of words in the keyword list to find matches. For example, an entry in a keyword list associated with an article about Katy Perry may include the keyword "Katy", the keyword "Perry" and the keyword group "Katy Perry".

At block 520, the CR system 420 determines a candidate component based on the one or more terms matching one or more keywords from a keyword list associated with that candidate component.

At block 522, the CR system ranks the candidate components determined at block 520 and block 516. In some embodiments, the ranking is performed using one or more default ranking rules. For example, a default ranking rule may specify that a music component is to be ranked higher than a news component. In some embodiments, the ranking is performed using one or more dynamic ranking rules. Dynamic ranking rules may be determined based on previous feedback to past inquiries. Each time an inquiry is sent to a client device for user feedback and such user feedback is received, the nature of the inquiry and the associated feedback may be stored. For example, an entry in a feedback data store may include entity data, intent data, a determined ranking of components associated with the entity data and/or intent data, user feedback and/or a user account identifier. Dynamic ranking rules may be determined based on previous feedback associated with a particular user account and/or based on previous feedback associated with multiple user accounts. In some embodiments, dynamic ranking rules apply weighted values to previous feedback associated with user accounts, where a higher weight is applied to previous feedback associated with a same user account as a current user account that is being used. In an example, a user associated with a particular user account may have previously provided utterances that resulted in entity data associated with the first component and additional entity data associated with the second component. In each previous instance, that user may have elected for content to be provided by the first component. In such an example, a dynamic rule may be generated for the user account associated with the user that ranks the first component over the second component. The dynamic rule may apply for multiple types of intent data and/or may only apply for a particular type of intent data. For example, the user may have selected a music component when a content only intent was determined. When new content only intent is determined from a new utterance, then the music component may be ranked above other components. However, when a different type of new intent is determined from a new utterance, then the music component may not be assigned the highest rank.

At block 524, the CR system generates message data comprising an inquiry asking for confirmation of one or more of the highest ranked candidate components. In some embodiments, the message data comprises an inquiry asks for confirmation that content associated with a highest ranked component was intended. In some embodiments, the message data lists two or more highest ranked components and asks for a user selection of content from one of the listed components. In some embodiments, one of the highest ranked components is a news component and the message data comprises a headline of a trending article that was identified at block 518.

In some embodiments, a confidence score is determined for the ranking. The confidence score may be determined based on previous feedback for the specific user account and/or for other user accounts. In some embodiments, the confidence score is determined by determining a number of previous utterances that resulted in a similar set of candidate components and the user feedback associated with the previous utterances. CR system 420 may determine a percentage of previous utterances that resulted in selection of the component that is presently assigned the highest rank. That determined percentage may be used as the confidence score for the ranking.

In some embodiments, if the ranking has an associated confidence score that exceeds a threshold, then no message data is generated for playback to a user (e.g., to be sent to a client device such as a speech-processing device). Instead, CR system 420 may automatically select the highest ranked component and generate new intent data associated with that component. The CR system may also generate new entity data in some instances. The CR system 420 may then send the new intent data, the entity data, the new entity data and/or the text data to the selected component without first asking the user.

In some embodiments, the message data comprises text data. At block 526, CR system 420 may send the message data to speech processing 298 and/or to a separate TTS component. At block 528, the TTS component of speech processing 298 (or separate TTS component) may convert the text data to audio data (e.g., generate audio of the message). At block 530, the speech processing 298 and/or separate TTS component may send the audio data to device 110. The device 110 may then output the audio data that comprises the message data generated at block 524.

At block 532, device 110 receives new audio corresponding to a new spoken utterance. At block 534, device 110 sends the new audio to speech processing component 298. At block 536, the speech processing component 298 performs ASR on the captured audio to generate text feedback data. At block 537, the speech processing component 298 sends the text feedback data to CR system 420. In some embodiments, speech processing 298 additionally generates new intent data and/or entity data from the text feedback data and sends the new intent data and/or entity data to CR system 420.

At block 538, CR system 420 determines a new intent data from the text feedback data. The new intent data may be determined based on the inquiry that was included in the message data generated at block 524 as well as the text feedback data. For example, if the message data comprised an inquiry that asked, "do you want me to play music by Katy Perry" and the text feedback data was "yes," then a new play music intent data may be generated. The new intent data may replace original intent data that was received at block 514. Alternatively, the new intent data may supplement original intent data that was received at block 514.

At block 539, the text feedback data is stored in a CR feedback store. An entry for the text feedback data may include a user account identifier for a user account associated with device 110, one or more candidate components that were determined at block 516, the ranking of the one or more candidate components, the text data, intent data and/or entity data received at block 514, the text feedback data and/or the new intent data. The entry for the text feedback data may additionally include a time stamp.

In the illustrated example, the message data generated at block 524 comprised a question asking whether the user wanted to hear a particular article available from second component 455. Accordingly, at block 540, CR system 420 may send the new intent data and the entity data to the second component (e.g., the news component). At block 542, the second component 455 may determine an article to output based on the received intent data and entity data. At block 546, the second component 455 may then convert the content to audio (e.g., generates audio of the news article). At block 548, the second component may send the audio to device 110 for output. Alternatively, second component 455 may send the content to TTS 214, which may generate audio of the content and send the audio to device 110.

In an alternative embodiment, CR system 420 may not send the new intent data and associated entity data to second component 465 (or to any other component). Instead, CR system 420 may include a data store (e.g., a database) of content that is available from one or more of the components. In such an instance, CR system 420 may determine the content to provide and convert that content to audio (or cause TTS 214 to do so). CR system 420 may then send the audio to the device 110.

In some embodiments, CR system 420 receives content to include in the data store on a periodic basis. In some embodiments, the contents of the data store are maintained in the data store for a limited amount of time (e.g., 1 day). The contents to include in the data store may be received, for example, along with a keyword lists that includes keywords associated with entities that represent the contents.

Figure 6:
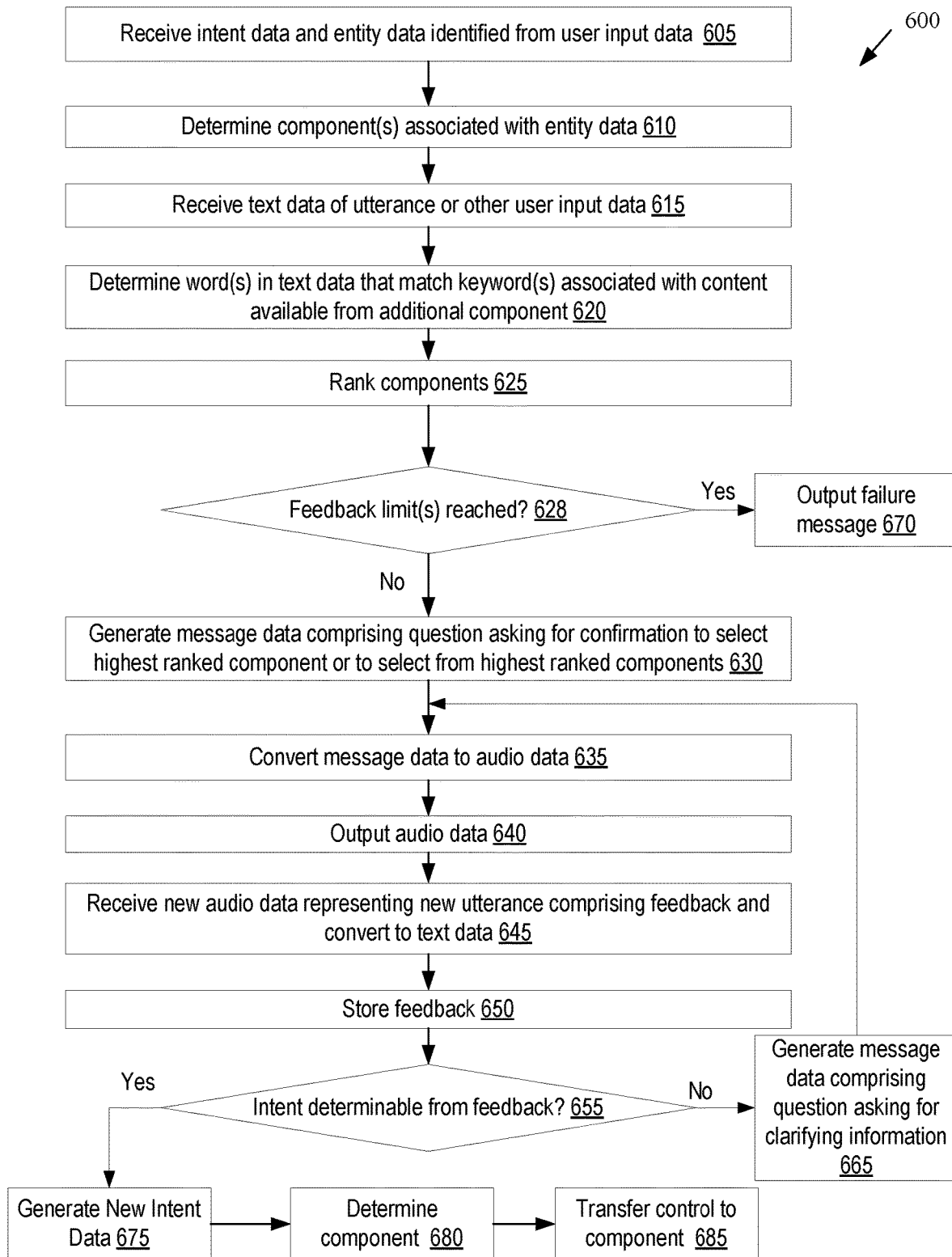
FIG. 6 is a flow diagram illustrating a method for performing conversational recovery according to embodiments of the present disclosure.
Figure 7:
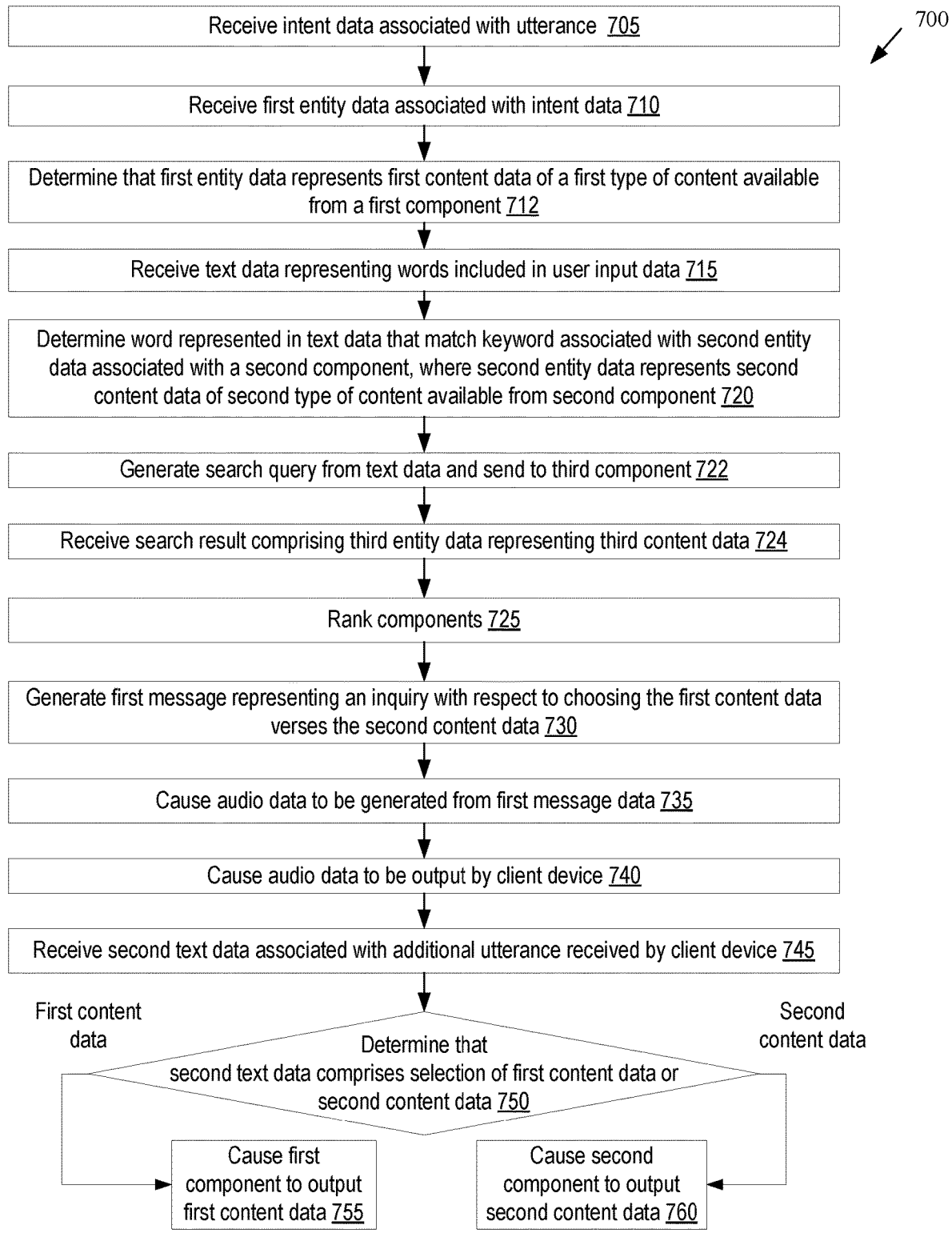
FIG. 7 is a flow diagram illustrating a method for performing conversational recovery according to embodiments of the present disclosure.
Figure 8:
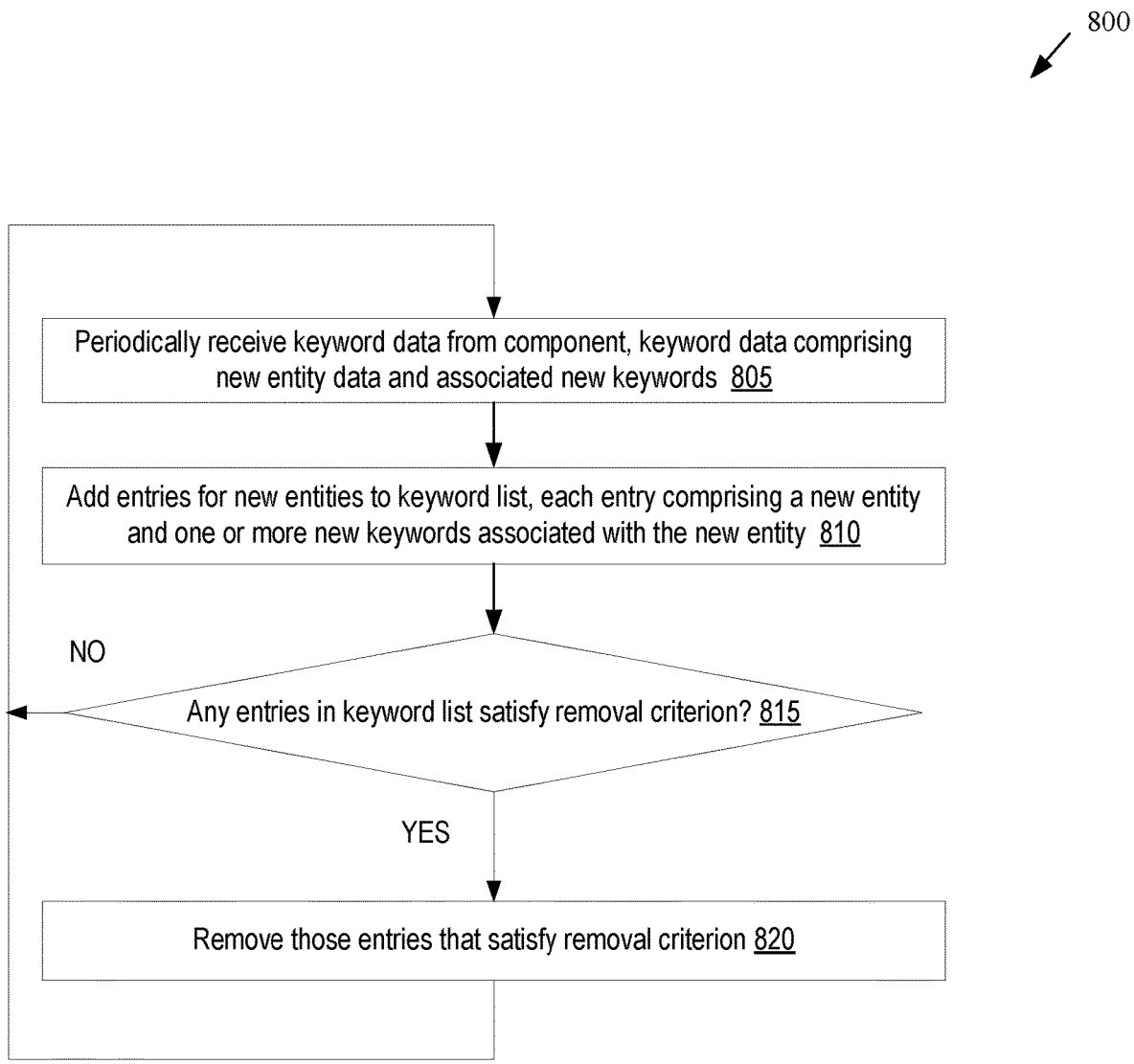
FIG. 8 is a flow diagram illustrating a method for maintaining a keyword list according to embodiments of the present disclosure.

FIGS. 6-8 are flow diagrams illustrating methods 600, 700, 800 associated with performing conversational recovery according to embodiments of the present disclosure. The methods 600, 700, 800 may be performed by a processing logic that may comprise hardware (e.g., circuitry, dedicated logic, programmable logic, microcode, etc.), software (e.g., instructions run on a processing device to perform hardware simulation), or a combination thereof. In some embodiments, at least some operations of methods 600, 700 and/or 800 are performed by components of a CR system executed by one or more server(s) 120*a*-*n* of FIG. 1.

For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram and/or events.

FIG. 6 is a flow diagram illustrating a method 600 for performing conversational recovery according to embodiments of the present disclosure. At block 605 of method 600, processing logic receives one or more intent data and one or more entity data identified from an utterance or other user input data received by a client device. In some embodiments, processing logic receives an N-best list of intent data and associated entity data. The intent data and entity data may be received from an NLU and/or orchestrator in embodiments. At block 610, processing logic determines one or more components associated with the received entity or entities. At block 615, processing logic receives a text data of the utterance or other user input data. At block 620, processing logic parses the text data to determine terms in the text data that match keywords associated with content or entities available from an additional component.

At block 625, processing logic ranks the components determined at blocks 610 and 620 as set forth above. In some embodiments, ranking the components comprises determining a ranking rule associated with the entity data, the text data and/or a user account associated with the client device. Processing logic may then determine the rank to assign to each candidate component based on the determined ranking rule.

At block 628, processing logic determines whether any feedback limits have been reached. There may be one or more limits on the number of inquiries to send to a user in a day, a number of questions to ask a user in an hour, a number of questions to ask a user in a session and/or transaction, and so on. In some embodiments, processing logic maintains one or more counts of a number of inquiries that have been sent to a user. In some embodiments, a first count comprises a number of inquiries that have been generated for a user account (e.g., sent to a user) in a current session of a first time period. A session may be initiated when a user speaks an utterance and may be terminated once a user intent is determined from that utterance and an action is performed to implement the user intent. In some embodiments, a second count comprises a number of inquiries that have been generated for the user account (e.g., sent to the user) in a time period (e.g., in a second time period). The time period(s) may be a 24 hour time period, may be a 1 hour time period, may be a 12 hour time period, or may be a calendar day, for example. In some embodiments, to determine if any feedback limits have been reached, processing logic determines whether a first amount of inquiries generated during a current session (e.g., the first count) exceed a first threshold. The number of inquiries may be an overall number of inquiries or a number of inquiries associated with a specific component or domain. If the threshold has been reached, then a feedback limit has been reached. In some embodiments, to determine if any feedback limits have been reached, processing logic determines whether a second amount of inquiries generated in a particular time period (e.g., the second count) exceeds a second threshold. If so, then a feedback limit has been reached. In some embodiments, a separate count is maintained for each component with regards to the first threshold and/or the second threshold. For example, a first count may track a number of inquiries sent to a user asking if a new article is desired and a second count may track a number of inquiries sent to a user asking if skill is desired. In some embodiments, the first threshold is 1 inquiry and the second threshold is 3 inquiries. In some embodiments, some components as associated with count thresholds, while other components are not associated with thresholds.

In some embodiments, a count associated with a component is incremented when a failure is determined but is not incremented when a success is determined. A failure may be determined when an inquiry associated with a component (e.g., an inquiry asking if the user would like content associated with a particular component to be played) receives a negative user feedback. When such negative user feedback is received for an inquiry associated with a component, the inquiry count associated with that component may be incremented. A success may be determined when an inquiry associated with a component receives a positive user response.

In some embodiments, one or more feedback limits associated with the highest ranked component are checked. If any of the feedback limits associated with the highest ranked component meet or exceed a threshold associated with the highest ranked component, then a feedback limit is reached.

If any feedback limits are reached, then the method proceeds to block 670 and message data comprising a failure message may be generated and output to a device. If at block 628 it is determined that no feedback limits are reached, the method continues to block 630.

In some embodiments, if the feedback limit associated with the highest ranked component is reached, then a second highest ranked component is selected. If the second highest ranked component does not exceed any feedback limits associated with that component, then the method proceeds to block 630 with the second highest ranked component being used in the stead of the highest ranked component.

At block 630, processing logic generates message data comprising a question asking for conformation to select a highest ranked component (or the second highest ranked component) or to select from a subset of the highest ranked components. The message data may be generated as text data. At block 635, processing logic may convert the text data to audio data. At block 640, processing logic outputs the audio data to a device (e.g., to a speech-detection device). At block 645, processing logic receives new audio data representing a new utterance comprising feedback (e.g., a response to the question generated at block 630) and converts the new audio data to new text data. Alternatively, other types of new input data may be received. At block 650, processing logic stores the feedback.

At block 655, processing logic determines whether a new intent data is determinable from the feedback. For example, if the question asked if the user wanted content provided by the highest ranked component and the user responded with a "yes", then that a new intent data associated with providing the content by the highest ranked component may be determined. If the user answered with a simple "no", then a new intent data may not yet be determinable. If the user responded with a more complex response, then this new complex response may be processed using an NLU to possibly determine a new intent data representing a user intent. For example, a user may respond with a "no, I want to do X." The additional data "I want to do X" may be usable to determine a new intent data. Alternatively, if the user responded with a "yes, but it should be X" then a new intent data may also be determinable.

If a new intent data is not determinable, the method proceeds to block 665. If a new intent data is determinable, the method continues to block 675 and a new intent data is generated. At block 680, a component and/or domain that can achieve the intent represented by the intent data is determined. At block 685, control may then be transferred to the component and/or domain (or, to a command processor associated with the component and/or domain). This may include invoking an appropriate command processor associated with the component/domain and sending the new intent data and the entity data to the command processor. Alternatively, processing logic may provide content data without transferring control to another domain and/or component.

At block 665, processing logic generates new message data comprising a question asking for clarifying information. The message data may comprise an inquiry that may ask the user if the user wants an experience provided by a next highest ranked component (as determined at block 625). Alternatively, the message data may list a number of highest ranked options and include a query that asks the user to select one of the highest ranked options. Alternatively, the message data may comprise a question asking a user, "please repeat your last command." The new message data may be generated as new text data. The method may then return to block 635 and the new text data may be converted to new audio data in some embodiments. This process may continue until a new intent data is determined and/or a feedback limit is reached. In some embodiments, the message data comprising the question for clarifying information does not cause the count associated with a component to be incremented and/or cause a general count to be incremented.

FIG. 7 is a flow diagram illustrating a method 700 for performing conversational recovery according to embodiments of the present disclosure. At block 705 of method 700, processing logic receives intent data associated with an utterance or other user input data received by a client device. The intent data may have been generated from text data of audio data representing the utterance by an NLU and may be received from the NLU and/or from an orchestrator. Alternatively, the intent data may have been generated from other user input data. Alternatively, the intent data may be received from a command processor and/or associated component (e.g., from any of command processors 290*a-n* or components 440-460). In some embodiments, processing logic receives an N-best list of intent data and entity data. The N-best list may include multiple intent data and multiple entity data. At block 710, processing logic receives first entity data associated with the intent data. The first entity data may also have been generated by the NLU from the text data and may also be received from the orchestrator. In some embodiments, the intent data and the first entity data are received together in message data. In some embodiments, additional entity data associated with the intent data may also be received. For example, multiple possible entity data options may be determined from the utterance, and entity data for each of the possible options may be received. In some embodiments, additional intent data associated with the utterance is also received. For example, multiple possible intents may be determined from the utterance, and intent data for each of the possible intents may be received. In some embodiments, additional intent data is received along with additional entity data associated with the additional intent data. In some embodiments, the received intent data and/or entity data includes an assigned ranking.

At block 712, processing logic determines that the first entity data represents first content data of a first type of content available from a first component. For example, the first component may be a music component and processing logic may determine that the first content data is music-related content. Processing logic may also determine that additional received entity data represents additional content data of an additional type of content available from an additional component. Additionally, processing logic may generate a query based on the text data, the intent data and/or the entity data. Processing logic may then send the query to one or more components. Those components may then perform searches and return search results to processing logic. If a component provides search results with a match to the intent data, entity data and/or text data, then that component may be a candidate component to provide a user experience.

At block 715, processing logic receives a text data representing words included user input data (e.g., in audio data representing the utterance). The text data may have been generated by a speech processing component 298 in some embodiments. At block 720, processing logic determines that a word represented in the text data matches a keyword associated with second entity data associated with a second component. The second entity data may represent second content data of a second type of content available from a second component. For example, the second component may be a news component, and the second entity may be a trending article available from the news component.

In some embodiments, processing logic maintains a keyword list associated with the second component. Each entry in the keyword list may include an entity data and one or more associated keywords. To determine that the word represented in the text data matches a keyword associated with the second entity data, processing logic may search the keyword list for one or more keywords that match one or more words represented by the text data. Based on this searching, processing logic may determine that the word represented by the text data matches the keyword. Processing logic may then determine that the keyword is associated with the second entity data. A single entity data may include multiple associated keywords. Multiple words represented by the text data may match to keywords associated with an entity data. In some embodiments, the more words from the text data that match keywords associated with the same entity data, the higher the probability that the entity data is desired by a user. In some embodiments, a confidence score is determined based on the degree of match between words of the text data and keywords associated with the second entity data. The keyword list may be maintained as set forth below with reference to FIG. 8.

At block 722, processing logic generates a search query from the text data. The search query may include all or a portion of the text data. In some embodiments, the query comprises the intent data and/or entity data instead of or in addition to the text data. Processing logic then sends the query to a third component (e.g., a skills index).

At block 724, processing logic receives search results from the third component. The search results may include third entity data that represents third content data available from the third component. The third entity data and/or third content data may have had a closest match to the text data, the intent data and/or the entity data received from the orchestrator. In some embodiments, the search results include a confidence score for the third entity data. In an example, the third component may be a skills index and the search results may include an identification of a skill that has been invoked based on text data of previous utterances or other user input data that are similar to the user input data represented in the text data.

At block 725, processing logic ranks the first component and second component. If any additional components were also identified (e.g., based on the text data and/or additional intent data and/or additional entity data and/or search results received from a component), processing logic includes such additional components in the ranking. In some embodiments, the ranking is performed using one or more default ranking rules. For example, a default ranking rule may specify that a music component is to be ranked higher than a news component. In some embodiments, the ranking is performed using one or more dynamic ranking rules. Dynamic ranking rules may be determined based on previous feedback to past inquiries. Each time an inquiry is sent to a client device for user feedback and such user feedback is received, the nature of the inquiry and the associated feedback may be stored. For example, an entry in a feedback data store may include entity data, intent data, a determined ranking of components associated with the entity data and/or intent data, user feedback and/or a user account identifier. Dynamic ranking rules may be determined based on previous feedback associated with a particular user account and/or based on previous feedback associated with multiple user accounts. In some embodiments, dynamic ranking rules apply weighted values to previous feedback associated with user accounts, where a higher weight is applied to previous feedback associated with a same user account as a current user account that is being used. In an example, a user associated with a particular user account may have previously provided utterances or other user input data that resulted in entity data associated with the first component and additional entity data associated with the second component. In each previous instance, that user may have elected for content to be provided by the first component. In such an example, a dynamic rule may be generated for the user account associated with the user that ranks the first component over the second component. The dynamic rule may apply for multiple types of intent data or may only apply for a particular type of intent data. For example, the user may have selected a music component when a content only intent data was determined. When new content only intent data is determined from audio data representing a new utterance or other user input data, then the music component may be ranked above other components. However, when a different type of new intent data is determined from a new user input data, then the music component may not be assigned the highest rank.

In some embodiments, processing logic determines a user account identifier (ID) associated with the client device. Processing logic may then determine first prior feedback data that is associated with the user account ID and the first component. Processing logic may additionally determine second prior feedback data that is associated with the user account ID and the second component. Processing logic may then, from the first feedback data and the second feedback data, determine a first selection ratio for the first component and a second selection ratio for the second component. A selection ratio for a component may represent a ratio of a number of times that a component was selected by a user to a number of times that the component was suggested (e.g., content from the component was suggested or an experience provided by the component was suggested). The selection ratios may be used to determine how to rank the components. In some embodiments, the selection ratios are used to generate ranking rules.

At block 730, processing logic generates first message data representing an inquiry with respect to choosing the first content data verses the second content data. The first message data may comprise text data, audio data and/or image data. For example, the inquiry may comprise a question asking for conformation to select a highest ranked component and/or to select from the first component and the second component. At block 735, processing logic causes audio data to be generated form the first message data. At block 740, processing logic causes a client device (e.g., to a speech-detection device) to output the audio data. At block 745, processing logic receives second text data associated with an additional utterance or other user input data received by the client device. The additional utterance or other user input data may comprise feedback (e.g., a response to the first message data generated at block 730). Processing logic may store the feedback.

At block 750, processing logic determines that the second text data represents a selection of the first content data and/or the second content data. If the second text data represents a selection of the first content data, the method proceeds to block 755 and processing logic causes the first component to output the first content data. In some embodiments, processing logic generates message data comprising the intent data and the first entity data. Processing logic may then send the message data to the first component. Alternatively, processing logic may send the message data to the orchestrator, which may then send the message data to the first component. In some embodiments, processing logic determines a user intent from the feedback and generates new intent data based on the determined user intent. Processing logic may associate the new intent data with the first entity data. In some embodiments, processing logic generates message data comprising the new intent data and the first entity data. Processing logic may then send the message data to the first component. Alternatively, processing logic may send the message data to the orchestrator, which may then send the message data to the first component. Alternatively, processing logic may output the first content data without transferring control to the first component.

If the second text data represents a selection of the second content data, the method proceeds to block 760 and processing logic causes the second component to output the second content data. In some embodiments, processing logic generates message data comprising the intent data and the second entity data. Processing logic may then send the message data to the second component. Alternatively, processing logic may send the message data to the orchestrator, which may then send the message data to the second component. In some embodiments, processing logic determines a user intent from the feedback and generates new intent data based on the determined user intent. Processing logic may associate the new intent data with the second entity data. In some embodiments, processing logic generates message data comprising the new intent data and the second entity data. Processing logic may then send the message data to the second component. Alternatively, processing logic may send the message data to the orchestrator, which may then send the message data to the second component. Alternatively, processing logic may output the second content data without transferring control to the second component.

FIG. 8 is a flow diagram illustrating a method 800 for maintaining a keyword list according to embodiments of the present disclosure. At block 805 of method 800, processing logic receives keyword data from a component (e.g., from a news component). The keyword data may comprise new entity data and new keywords associated with the new entity data. For example, the keyword data may include a first new entity and one or more keywords associated with the first new entity and a second new entity and one or more additional keywords associated with the second new entity. In some embodiments, processing logic additionally receives the content represented by the new entity associated with the one or more keywords. Processing logic may then store the new content in a data store.

At block 810, processing logic may add an entry to a keyword list for each new entity data that is received. Each entry may include a new entity data and one or more associated keywords. In some embodiments, a separate entry is created in the keyword list for each keyword. Each keyword may be associated with a single entity data or with multiple entity data.

At block 815, processing logic determines whether any entries in the keyword list satisfy a removal criterion. In some embodiments, each entry in the keyword list has a time stamp. The time stamp may identify the date and time at which the entry was added to the keyword list and/or a date and time that an entity data associated with the entry in the keyword list was generated. In some embodiments, the removal criterion is a time threshold. Processing logic may determine the age of each entry in the keyword list based on the time stamps associated with the entries. If any entry has been on the keyword list for longer than a threshold amount of time, then that entry may satisfy the removal criterion. For example, if a time stamp for an entry shows that the entry has been on the keyword list for a day or more, then the entry may satisfy the removal criterion.

At block 820, processing logic removes those entries that satisfy the removal criterion from the keyword list. This may ensure that the keyword list represents entity data associated with currently trending content (e.g., currently trending news articles). The method may then return to block 805 after a designated amount of time has passed. For example, processing logic may repeat method 800 every 5 minutes, every 10 minutes, every 15 minutes, every 30 minutes, every hour, every day, or at some other interval.

If content represented by an entity data associated with one or more keywords in the keyword list has been stored in a data store, then such content may have a time stamp that matches a time stamp of the entry in the keyword list associated with the entity representing such content. The content may be removed from the data store when the entry containing the associated entity is removed from the keyword list.

Figure 9:
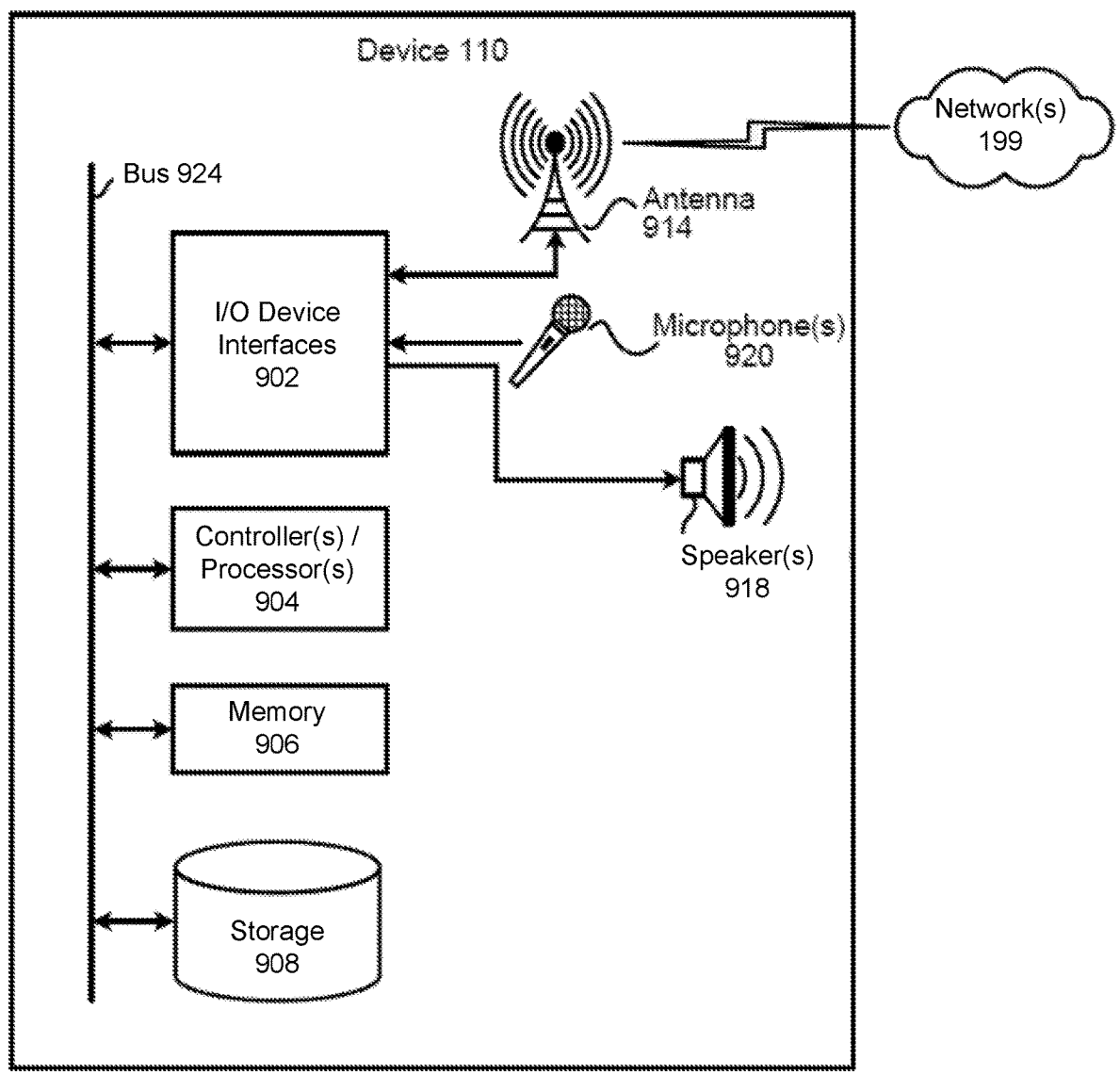
FIG. 9 is a block diagram conceptually illustrating example components of a device according to embodiments of the present disclosure.
Figure 10:
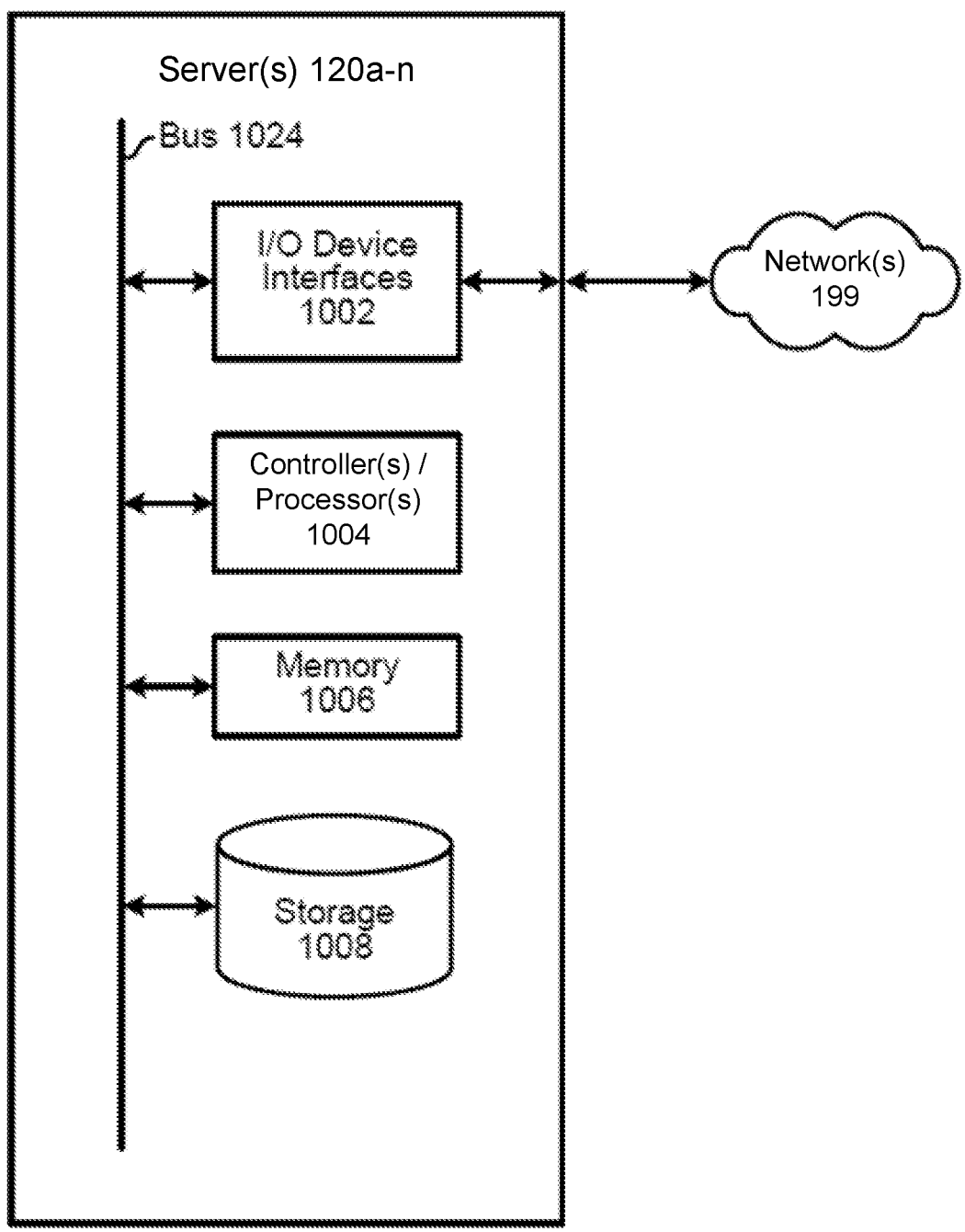
FIG. 10 is a block diagram conceptually illustrating example components of a server according to embodiments of the present disclosure.

FIG. 9 is a block diagram conceptually illustrating a user device, such as the device 110, that may be used with the described system 100. FIG. 10 is a block diagram conceptually illustrating example components of a remote device, such as the server(s) 120a-n, which may assist with ASR processing, NLU processing, and/or command processing. Multiple servers 120a-n may be included in the system 100, such as one server for performing ASR, one server for performing NLU, etc. In operation, each of these devices (or groups of devices) may include computer-readable and computer-executable instructions that reside on the respective device 110, 120a-n, as will be discussed further below.

Each of these devices 110, 120a-n may include one or more controllers/processors 904, 1004, which may each include a central processing unit (CPU) for processing data and computer-readable instructions, and a memory 906, 1006 for storing data and instructions of the respective device. The memories 906, 1006 may individually include volatile random access memory (RAM), non-volatile read only memory (ROM), non-volatile magnetoresistive (MRAM), and/or other types of memory. Each device 110, 120a-n may also include a data storage component 908, 1008 for storing data and controller/processor-executable instructions. Each data storage component 908, 1008 may individually include one or more non-volatile storage types such as magnetic storage, optical storage, solid-state storage, etc. Each device 110, 120a-n may also be connected to removable and/or external non-volatile memory and/or storage (such as a removable memory card, memory key drive, networked storage, etc.) through respective input/output device interfaces 902, 1002.

Computer instructions for operating each device 110, 120a-n and its various components may be executed by the respective device's controller(s)/processor(s) 904, 1004, using the memory 906, 1006 as temporary "working" storage at runtime. A device's computer instructions may be stored in a non-transitory manner in non-volatile memory 906, 1006, storage 908, 1008, and/or an external device(s). Alternatively, some or all of the executable instructions may be embedded in hardware and/or firmware on the respective device in addition to or instead of software.

Each device 110, 115, 120a-n includes input/output device interfaces 902, 1002. A variety of components may be connected through the input/output device interfaces 902, 1002, as will be discussed further below. Additionally, each device 110, 115, 120a-n may include an address/data bus 924, 1024 for conveying data among components of the respective device. Each component within a device 110, 115, 120a-n may also be directly connected to other components in addition to (or instead of) being connected to other components across the bus 924, 1024.

Referring to FIG. 9, the device 110 may include input/output device interfaces 902 that connect to a variety of components such as an audio output component such as a speaker(s) 918, a wired headset and/or a wireless headset (not illustrated), and/or other component capable of outputting audio. The device 110 may also include an audio capture component. The audio capture component may be, for example, a microphone 920 or array of microphones, a wired headset and/or a wireless headset (not illustrated), etc. The microphone(s) 920 may be configured to capture audio. If an array of microphones 918 is included, approximate distance to a sound's point of origin may be determined by acoustic localization based on time and amplitude differences between sounds captured by different microphones of the array.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment.

As noted above, multiple devices may be employed in a single speech processing system 100. In such a multi-device system, each of the devices may include different components for performing different aspects of the speech processing. The multiple devices may include overlapping components. The components of the device(s) 110 and the server(s) 120a-n, as illustrated in FIGS. 9 and 10, are exemplary, and may be located as a stand-alone device and/or may be included, in whole or in part, as a component of a larger device and/or system.

Figure 11:
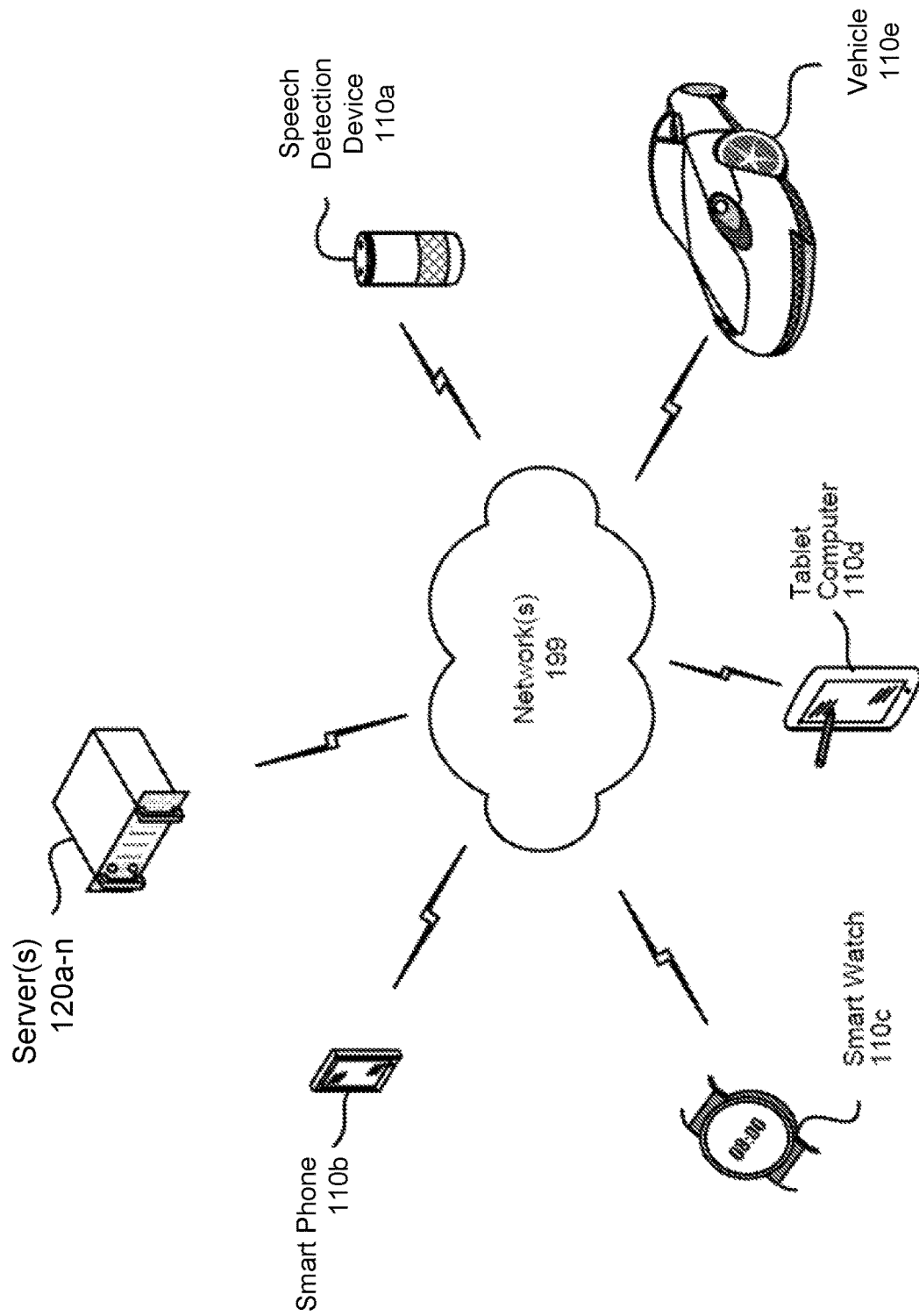
FIG. 11 illustrates an example of a computer network for use with the speech processing system.

As illustrated in FIG. 11, multiple devices (110a-110e, 120a-n) may contain components of the system 100 and the devices may be connected over a network(s) 199. The network(s) 199 may include a local and/or private network and/or may include a wide network such as the Internet. Devices may be connected to the network(s) 199 through either wired and/or wireless connections. For example, a speech-detection device 110a, a smart phone 110b, a smart watch 110c, a tablet computer 110d, and/or a vehicle 110e may be connected to the network(s) 199 through a wireless component provider, over a Wi-Fi and/or cellular network connection, or the like. Other devices are included as network-connected support devices, such as the server(s) 120a-n, or others. The support devices may connect to the network(s) 199 through a wired connection and/or wireless connection. Networked devices may capture audio using one-or-more built-in and/or connected microphones and/or audio capture devices, with processing performed by ASR, NLU, and/or other components of the same device and/or another device connected via the network(s) 199, such as the ASR component 250, the NLU component 260, etc. of one or more servers 120a-n.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving input data representing a natural language input to a client device;
processing the input data to determine first natural language understanding (NLU) data representing a first interpretation of the natural language input;
determining the first NLU data corresponds to a potential failure response;
based at least in part on determining the first NLU data corresponds to a potential failure response, determining first data representing a semantic similarity between the input data and previous input data representing a previous natural language input;
determining, based at least in part on the first data, second NLU data corresponding to the previous input data and representing a second interpretation of the natural language input;
determining output data using the second NLU data; and
sending the output data to the client device.

2. The computer-implemented method of claim 1, wherein processing the input data comprises:
performing NLU processing to determine the first NLU data and the second NLU data.

3. The computer-implemented method of claim 1, further comprising:
performing NLU processing to determine the first NLU data and a first score corresponding to the first NLU data; and
prior to determining the first NLU data corresponds to a potential failure response, determining the first score corresponds to a preferred rank among a plurality of interpretations of the natural language input.

4. The computer-implemented method of claim 1, wherein the first NLU data includes first intent data different than second intent data included in the second NLU data.

5. The computer-implemented method of claim 4, wherein the first NLU data and the second NLU data includes first entity data.

6. The computer-implemented method of claim 1, wherein:
the first NLU data corresponds to first content associated with a first component;
the method further comprises determining a portion of the input data corresponds to a second component; and
determining the first NLU data corresponds to a potential failure response is based at least in part on the portion of the input data corresponding to the second component.

7. The computer-implemented method of claim 1, wherein determining the output data using the second NLU data is based at least in part on feedback data.

8. The computer-implemented method of claim 1, further comprising:
determining the natural language input lacks a verb,
wherein determining the first NLU data corresponds to a potential failure response is based at least in part on the natural language input lacking a verb.

9. The computer-implemented method of claim 1, wherein determining the output data using the second NLU data is performed at least in part to avoid presenting a failure response.

10. A system comprising:
at least one processor; and
at least one memory comprising instructions that, when executed by the at least one processor, cause the system to:
receive input data representing a natural language input to a client device;
process the input data to determine a first interpretation of the natural language input;
determine the first interpretation corresponds to a potential failure response;
send, to the client device, first data requesting selection of a second interpretation of the natural language input, the second interpretation being different from the first interpretation;
determine output data based at least in part on the second interpretation; and
send the output data to the client device.

11. The system of claim 10, wherein the first data further includes an indication of the first interpretation.

12. The system of claim 10, wherein the input data comprises input audio data and wherein the at least one memory further comprises instructions that, when executed by the at least one processor, further cause the system to:
perform automatic speech recognition processing using the input audio data to determine automatic speech recognition (ASR) data;
perform text-to-speech processing using the ASR data to determine output audio data; and
include in the first data the output audio data.

13. The system of claim 12, wherein the at least one memory further comprises instructions that, when executed by the at least one processor, further cause the system to:
process the ASR data to determine natural language understanding data representing the first interpretation.

14. The system of claim 10, wherein the at least one memory further comprises instructions that, when executed by the at least one processor, further cause the system to:
determine second data representing a semantic similarity between the natural language input and previous user input data corresponding to the second interpretation,
wherein the output data is determined based at least in part on the second data.

15. The system of claim 10, wherein the at least one memory further comprises instructions that, when executed by the at least one processor, further cause the system to:
determine the natural language input lacks a verb,
wherein the instructions that cause the system to determine the first interpretation corresponds to a potential failure response are based at least in part on the natural language input lacking a verb.

16. The system of claim 10, wherein the instructions that cause the system to determine the output data based at least in part on the second interpretation are performed based at least in part on feedback data.

17. The system of claim 10, wherein the instructions that cause the system to process the input data comprise instructions that, when executed by the at least one processor, further cause the system to:
performing natural language understanding (NLU) processing to determine first NLU data corresponding to the first interpretation and second NLU data corresponding to the second interpretation.

18. The system of claim 17, wherein the instructions that determine the first interpretation corresponds to a potential failure response are based at least in part on the first NLU data.

19. The system of claim 10, wherein:
the first interpretation corresponds to first content associated with a first component;
the at least one memory further comprises instructions that, when executed by the at least one processor, further cause the system to determine a portion of the input data corresponds to a second component; and
determine the first interpretation corresponds to a potential failure response based at least in part on the portion of the input data corresponding to the second component.

* * * * *